(12) United States Patent
Clements et al.

(10) Patent No.: US 12,435,668 B1
(45) Date of Patent: Oct. 7, 2025

(54) METHODS AND APPARATUS FOR ANTI-ICE HEAT SUPPLY FROM WASTE HEAT RECOVERY SYSTEMS

(71) Applicant: General Electric Company, Evendale, OH (US)

(72) Inventors: Jeffrey D. Clements, Evendale, OH (US); Arthur W. Sibbach, Boxford, MA (US); Daniel A. Niergarth, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/935,194

(22) Filed: Nov. 1, 2024

(51) Int. Cl.
*F02C 7/047* (2006.01)
*F02C 7/12* (2006.01)
*F02C 7/224* (2006.01)

(52) U.S. Cl.
CPC .............. *F02C 7/047* (2013.01); *F02C 7/12* (2013.01); *F02C 7/224* (2013.01)

(58) Field of Classification Search
CPC . F02C 7/047; F02C 7/12; F02C 7/224; B64D 2013/0607; B64D 15/00; B64D 15/02; B64D 15/04; B64D 15/06
See application file for complete search history.

(56) References Cited

U.S. PATENT DOCUMENTS

| | | | |
|---|---|---|---|
| 5,484,122 A | 1/1996 | DeSalve | |
| 7,374,404 B2 | 5/2008 | Schilling | |
| 9,045,991 B2 | 6/2015 | Read et al. | |
| 9,114,877 B2 | 8/2015 | Weber et al. | |
| 9,868,540 B2 | 1/2018 | Barmichev et al. | |
| 9,982,598 B2 | 5/2018 | Pritchard, Jr. et al. | |
| 10,100,733 B2 | 10/2018 | O'Toole et al. | |
| 10,294,816 B2 | 5/2019 | Mountz et al. | |
| 10,294,873 B2 | 5/2019 | Papa et al. | |
| 10,589,866 B2 | 3/2020 | Morishita et al. | |
| 10,634,050 B2 | 4/2020 | Beutin et al. | |
| 10,711,797 B2 | 7/2020 | Kroger et al. | |
| 10,724,435 B2 | 7/2020 | Kroger et al. | |
| 10,794,396 B2 | 10/2020 | Kroger et al. | |

(Continued)

FOREIGN PATENT DOCUMENTS

| | | |
|---|---|---|
| CN | 209634737 U | 11/2019 |
| CN | 115973421 A | 4/2023 |

*Primary Examiner* — Craig Kim
(74) *Attorney, Agent, or Firm* — Hanley, Flight & Zimmerman, LLC

(57) ABSTRACT

Methods and apparatus for anti-ice heat supply from waste heat recovery systems are disclosed. An apparatus for an aircraft, the apparatus comprising a fuel heat exchange system, an anti-ice heat exchanger, a waste heat recovery heat exchanger, and a conduit coupled to the fuel heat exchange system, the anti-ice heat exchanger, and the waste heat recovery heat exchanger, the conduit including a first portion and a second portion distinct from the first portion, wherein the first portion of the conduit carries a first portion of a thermal transfer fluid from the waste heat recovery heat exchanger to the anti-ice heat exchanger in which the thermal transfer fluid supplies anti-ice heat to a portion of the aircraft, wherein the second portion of the conduit carries a second portion of the thermal transfer fluid from the waste heat recovery heat exchanger to the fuel heat exchange system.

20 Claims, 11 Drawing Sheets

(56) References Cited

U.S. PATENT DOCUMENTS

| | | | |
|---|---|---|---|
| 10,815,886 B2 | 10/2020 | Kroger et al. | |
| 10,823,066 B2* | 11/2020 | Miller | F01D 11/24 |
| 10,961,907 B2 | 3/2021 | Castillo De Alvear et al. | |
| 11,214,376 B2 | 1/2022 | Kutzmann et al. | |
| 11,434,824 B2 | 9/2022 | Rambo et al. | |
| 11,518,525 B2 | 12/2022 | Suciu et al. | |
| 11,542,870 B1* | 1/2023 | Rambo | F02C 7/22 |
| 11,674,438 B1 | 6/2023 | Rambo | |
| 11,725,584 B2* | 8/2023 | Niergarth | F02C 7/14 60/806 |
| 11,739,689 B2 | 8/2023 | Sibbach et al. | |
| 11,815,024 B2* | 11/2023 | Niergarth | F28F 23/00 |
| 11,828,223 B2 | 11/2023 | Briley et al. | |
| 11,927,142 B2* | 3/2024 | Westervelt | F02C 9/52 |
| 11,946,378 B2* | 4/2024 | Westervelt | F02C 7/185 |
| 11,976,863 B2* | 5/2024 | Snape | F02C 7/185 |
| 11,994,066 B2* | 5/2024 | Miller | F02C 7/14 |
| 12,018,594 B2* | 6/2024 | Sibbach | F02C 7/224 |
| 12,037,943 B2* | 7/2024 | St. Pierre | F02C 7/10 |
| 2011/0131999 A1 | 6/2011 | Gao et al. | |
| 2014/0250898 A1 | 9/2014 | Mackin et al. | |
| 2017/0167382 A1* | 6/2017 | Miller | B64D 15/06 |
| 2017/0267360 A1 | 9/2017 | Heid | |
| 2017/0268423 A1 | 9/2017 | Schwarz | |
| 2017/0268430 A1 | 9/2017 | Schwarz | |
| 2017/0268431 A1 | 9/2017 | Schwarz | |
| 2017/0363014 A1 | 12/2017 | Taylor et al. | |
| 2018/0073431 A1 | 3/2018 | Smith et al. | |
| 2019/0039742 A1 | 2/2019 | Gordon et al. | |
| 2021/0284351 A1 | 9/2021 | Chilukuri et al. | |
| 2021/0340914 A1* | 11/2021 | Niergarth | F02C 7/141 |
| 2021/0348564 A1 | 11/2021 | Mackin et al. | |
| 2022/0145796 A1 | 5/2022 | Hallisey et al. | |
| 2022/0252011 A1 | 8/2022 | Rambo et al. | |
| 2023/0228214 A1 | 7/2023 | Miller et al. | |
| 2023/0383694 A1 | 11/2023 | Palmer | |
| 2023/0392549 A1 | 12/2023 | Sharma et al. | |
| 2024/0011417 A1* | 1/2024 | Sibbach | F01D 21/12 |
| 2024/0084731 A1 | 3/2024 | Retersdorf et al. | |
| 2024/0102417 A1 | 3/2024 | Taylor et al. | |

\* cited by examiner

METHODS AND APPARATUS FOR ANTI-ICE HEAT SUPPLY FROM WASTE HEAT RECOVERY SYSTEMS

FIELD OF THE DISCLOSURE

This disclosure relates generally to aircraft and, more particularly, to methods and apparatus for anti-ice heat supply from waste heat recovery systems.

BACKGROUND

A conventional commercial aircraft generally includes a fuselage, a pair of wings, and a propulsion system that provides thrust. The propulsion system typically includes one or more aircraft engines, such as turbofan jet engines. The aircraft engine(s) may be typically mounted to a respective one of the wings of the aircraft, such as in a suspended position beneath the wing.

An aircraft engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, which creates combustion gases. The combustion gases flow from the combustion section through a hot gas path defined within the turbine section and then exit the turbine section via the exhaust section.

During inclement weather, freezing rain, hail, sleet, and/or ice can accumulate on the wings and inlet components of aircraft engines. Accumulated ice can break off and be ingested into the engine. Further, large portions of ice can damage engine fan blades or other downstream components of the engine. Additionally, ice accumulation can reduce an ability of the wings to operate as designed.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Anti-ice systems in traditional tube and wing aircraft use bleed air from aircraft engines to convey heat from the aircraft engines to the wings and other portions of the aircraft to prevent or reduce the accumulation and/or formation of ice. Cooling bleed air can be utilized to reduce a level of airflow needed to maintain turbine materials within acceptable ranges. However, extracting the bleed air can reduce an efficiency of the engine. Examples disclosed herein provide anti-ice systems that convey heat from the aircraft engines to the wings and other portions of the aircraft to prevent or reduce the accumulation and/or formation of ice while reducing an effect of doing so on a performance of the aircraft engines. For example, the anti-ice systems disclosed herein can reduce a rate at which bleed air is extracted from the aircraft engine to prevent or reduce the accumulation and/or formation of ice. Inclusion of example anti-ice systems disclosed herein provides an anti-icing or de-icing mechanism that prevents the buildup and shedding of pieces of ice into the engine during, e.g., adverse weather conditions, resulting in safer operation of the gas turbine engine.

Figure 1:
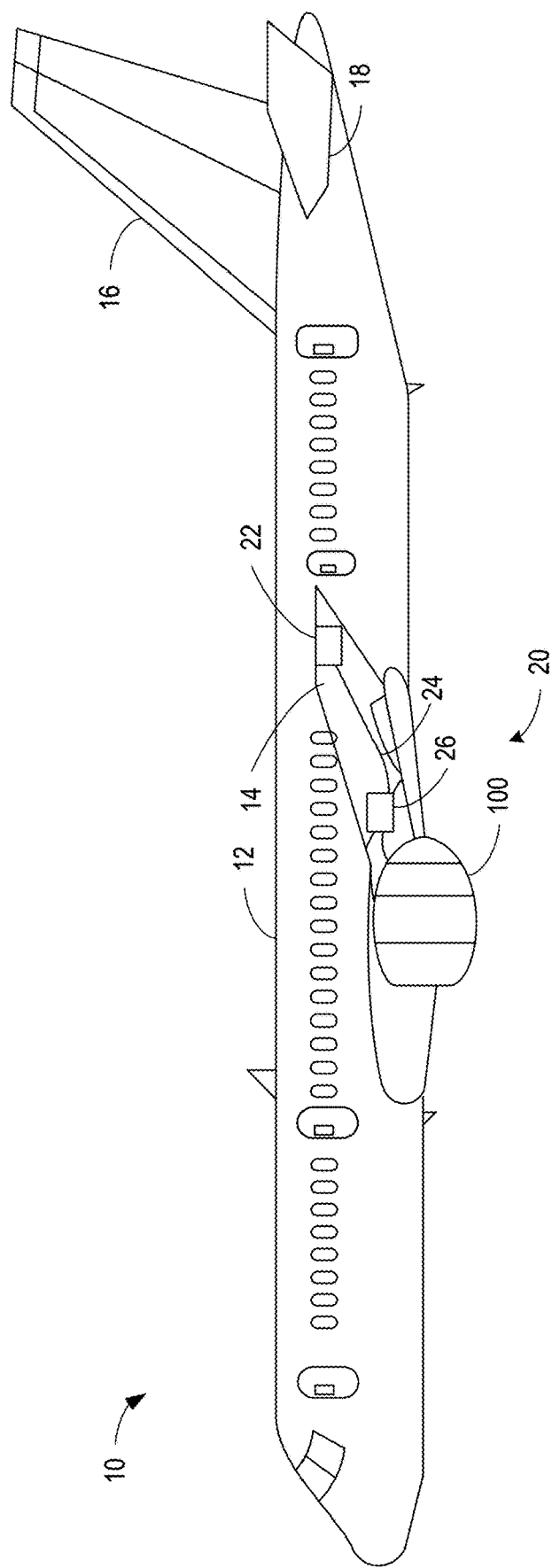
FIG. 1 is a schematic view of an aircraft including an anti-ice system in accordance with the teachings of this disclosure.

Referring now to the drawings, FIG. 1 is a side view of one example of an aircraft 10. As shown, the aircraft 10 includes a fuselage 12 and a pair of wings 14 (one is shown) extending outward from the fuselage 12. In the illustrated example, a gas turbine engine 100 is supported on each wing 14 to propel the aircraft through the air during flight. In the illustrated example, the gas turbine engine 100 is an aeronautical, turbofan jet engine, referred to herein as "aircraft engine 100" or just "engine." Additionally, as shown, the aircraft 10 includes a vertical stabilizer 16 and a pair of horizontal stabilizers 18 (one is shown). However, in alternative examples, the aircraft 10 may include any other suitable configuration, such as any other suitable number or type of engines, trusses to support the wings 14, etc.

In the illustrated example of FIG. 1, the aircraft 10 includes an anti-ice system 20. The anti-ice system 20 includes the aircraft engine 100, an anti-ice heat exchanger 22, and a conduit 24 that carries a thermal transfer fluid between the aircraft engine 100 and the anti-ice heat exchanger 22, as discussed in further detail in FIGS. 2-7. In some examples, the anti-ice heat exchanger 22 is structured as a conduit (e.g., coupled to and/or implemented as part of the conduit 24) that enables heat from the thermal transfer fluid to be transferred to a portion of the aircraft 10 (e.g., the wings 14) to prevent ice formation and/or melt accumulated ice. In some examples, the anti-ice heat exchanger 22 includes pipe(s), plate(s), baffle(s), fin(s), and/or other components to facilitate the heat transfer between the portion of the aircraft 10 and the thermal transfer fluid.

The anti-ice system 20 can also enable the thermal transfer fluid to transfer heat to and/or from one or more other fluids supporting operations associated with the aircraft 10. For example, the aircraft 10 also includes a supplemental heat exchange system 26 (e.g., a system of one or more supplemental heat exchangers) in which the thermal transfer fluid transfers heat to another fluid associated with operations of the aircraft 10. For example, the fluid can be fuel that is being carried to the aircraft engine 100 for combustion. Alternatively, the fluid can be associated with one or more accessory systems configured to support the operation of the aircraft 10. For example, in some examples, such accessory systems include a lubrication system that lubricates components of the engines 100, a cooling system that provides cooling air to components of the engines 100, an environmental control system that provides cooled air to the cabin of the aircraft 10, and/or the like. In such examples, the supplemental heat exchange system 26 is configured to transfer heat to and/or from one or more fluids supporting the operation of the aircraft 10 (e.g., the oil of the lubrication system, the air of the cooling system and/or the environmental control system, the fuel supplied to the engines 100, etc.). However, in alternative examples, the supplemental heat exchange system 26 may be configured to transfer heat to and/or from any other suitable fluids supporting the operation of the aircraft 10. In this example, the supplemental heat exchange system 26 is positioned in the wing 14. Additionally or alternatively, the supplemental heat exchange system 26 can be positioned in the engines 100 and/or in the fuselage 12.

In some examples, the thermal transfer fluid includes a gas. In some examples, the thermal transfer fluid includes a supercritical fluid. Supercritical fluids include fluids at temperatures above and pressures above their critical point, where there are not distinct liquids or gas phases. In some examples, the thermal transfer fluid includes supercritical carbon dioxide ($sCO_2$). In some examples, the thermal transfer fluid includes supercritical nitrogen ($sN_2$). In some examples, the thermal transfer fluid includes Helium (He). In some examples, the thermal transfer fluid includes a liquid such as ethylene glycol and water (EGW) and/or one or more commercial thermal transfer fluids. In some examples, the thermal transfer fluid includes a phase-changing material such as a commercial refrigerant.

FIGS. 2-6 are schematic cross-sectional views of example anti-ice systems 200, 300, 400, 500, 600 that can be implemented in the aircraft 10 of FIG. 1. Specifically, the anti-ice systems 200, 300, 400, 500, 600 are representative of example implementations of the anti-ice system 20 of FIG. 1. As such, the anti-ice systems 200, 300, 400, 500, 600 can carry the thermal transfer fluid between the aircraft engine 100, an anti-ice heat exchanger (e.g., the anti-ice heat exchanger 22 of FIG. 1), and/or a supplemental heat exchange system (e.g., the supplemental heat exchange system 26 of FIG. 1). The anti-ice systems 200, 300, 400, 500, 600 can be referred to as and/or include thermal transport buses (TTBs).

In the illustrated example of FIGS. 2-6, the engine 100 is a turbofan-type of engine. However, the principles of the present disclosure are also applicable to other types of engines, such as turboprop engines and engines without a nacelle, such as unducted fan (UDF) engines (sometimes referred to as propfans). Further, the examples disclosed herein can be implemented on other types of gas turbines, such as non-aircraft engines and/or power generators.

As shown in FIGS. 2-6, the gas turbine engine 100 includes an outer bypass duct 102 (which may also be referred to as a nacelle, fan duct, or outer casing), a core turbine engine 104, and a fan section 106. The core turbine engine 104 and the fan section 106 are disposed at least partially in the outer bypass duct 102. The core turbine engine 104 is disposed downstream from the fan section 106.

As shown in FIGS. 2-6, the gas turbine engine 100 defines a longitudinal or axial centerline axis 108 extending therethrough for reference. The core turbine engine 104 includes an outer casing 110 (which may also be referred to as a mid-casing), which is substantially tubular and defines an annular inlet 112. The outer casing 110 of the core turbine engine 104 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustor 118 (e.g., a combustion section), a turbine section having a high pressure turbine 120 ("HP turbine 120") and a low pressure turbine 122 ("LP turbine 122"), and an exhaust section 124. Although examples disclosed herein provide a certain configuration for a compressor section (e.g., the LP compressor 114, HP compressor 116) and turbine section (e.g., the HP turbine 120, the LP turbine 122), it should be understood that this configuration is an example, and other configurations can be utilized in conjunction with the teachings of this disclosure.

The core turbine engine 104 includes a high pressure shaft 126 ("HP shaft 126") that drivingly couples the HP turbine 120 and the HP compressor 116. The gas turbine engine 100 also includes a low pressure shaft 128 ("LP shaft 128") that drivingly couples the LP turbine 122 and the LP compressor 114. The LP shaft 128 also couples to a fan shaft 130.

The fan section 106 includes a plurality of fan blades 132 that are coupled to and extend radially outward from the fan shaft 130. In some examples, the LP shaft 128 may couple directly to the fan shaft 130 (i.e., a direct-drive configuration). In alternative configurations, the LP shaft 128 may couple to the fan shaft 130 via a reduction gear 134 (i.e., an indirect-drive or geared-drive configuration). While in this example the core turbine engine 104 includes two compressor and two turbines, in other examples, the core turbine engine 104 may only include one compressor and one turbine. Further, in other examples, the core turbine engine 104 can include more than two compressors and turbines. In such examples, the core turbine engine 104 may include more than two drive shafts or spools. The gas turbine engine 100 includes a compressor frame (not shown) to support a forward portion of the core turbine engine 104.

As illustrated in FIGS. 2-6, during operation of the gas turbine engine 100, air 136 enters an inlet portion 138 of the gas turbine engine 100. The air 136 is accelerated by the fan blades 132. A first portion 140 of the air 136 flows into a bypass airflow passage 142, while a second portion 144 of the air 136 flows into the inlet 112 of the core turbine engine 104 (and, thus, into the LP compressor 114). Downstream of the inlet 112, one or more sequential stages of LP compressor stator vanes 146 and LP compressor rotor blades 148 coupled to the LP shaft 128 progressively compress the second portion 144 of the air 136 flowing through the LP compressor 114 en route to the HP compressor 116. Next, one or more sequential stages of HP compressor stator vanes 150 and HP compressor rotor blades 152 coupled to the HP shaft 126 further compress the second portion 144 of the air 136 flowing through the HP compressor 116. This provides compressed air 154 to the combustor 118 where it mixes with fuel and burns to provide combustion gases 156.

In the illustrated example of FIGS. 2-6, fuel (e.g., hydrogen, Jet-A fuel, etc.) is injected into the combustor 118 by one or more nozzles 157. The fuel associated with the gas turbine engine 100 of FIGS. 2-6 can be hydrogen, liquid natural gas, ammonia, and/or kerosene that is stored (e.g., in a component of an aircraft associated with the gas turbine engine 100) at a relatively cold temperature (e.g., colder than a temperature at which the fuel is able to ignite in the presence of an ignition source, such as a spark, flame, and/or hot surface in the combustor 118). For example, hydrogen fuel can be stored in a liquid state (e.g., a liquid phase) to enable a size of an associated storage tank to be reduced and/or to prevent the hydrogen fuel from overheating during an operation of the gas turbine engine 100. In some examples, a fuel heat exchange system (e.g., a system of one or more heat exchangers) enables a temperature of the fuel to be adjusted between the storage tank and the nozzles 157 to prepare the fuel for combustion, as discussed in further detail in association with FIGS. 2-5 and 7.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. This energy extraction supports operation of the HP compressor 116. The combustion gases 156 then flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the fan shaft 130. The combustion gases 156 then exit the core turbine engine 104 through the exhaust section 124 thereof. The combustion gases 156 mix with the first portion 140 of the air 136 from the bypass airflow passage 142. The combined gases exit an exhaust nozzle 170 (e.g., a converging/diverging nozzle) of the bypass airflow passage 142 to produce propulsive thrust. The gas turbine engine 100 includes a turbine frame (not shown) to support an aft portion of the core turbine engine 104. In some examples, the turbine frame is positioned downstream of the LP turbine 122.

In the illustrated example of FIGS. 2-6, the engine 100 includes a waste heat recovery heat exchanger 172 positioned in the exhaust section 124 of the core turbine engine 104. Specifically, the waste heat recovery heat exchanger 172 is positioned in a core flow path. As used herein, the "core flow path" is positioned radially inward of the outer casing 110 and is followed and/or defined by the second portion 144 of the air 136, the compressed air 154, and the combustion gases 156. Accordingly, the waste heat recovery heat exchanger 172 receives a thermal transfer fluid and the combustion gases 156 downstream of the LP turbine 122. As such, the thermal transfer fluid absorbs heat from the combustion gases 156 in the waste heat recovery heat exchanger 172.

Figure 2:
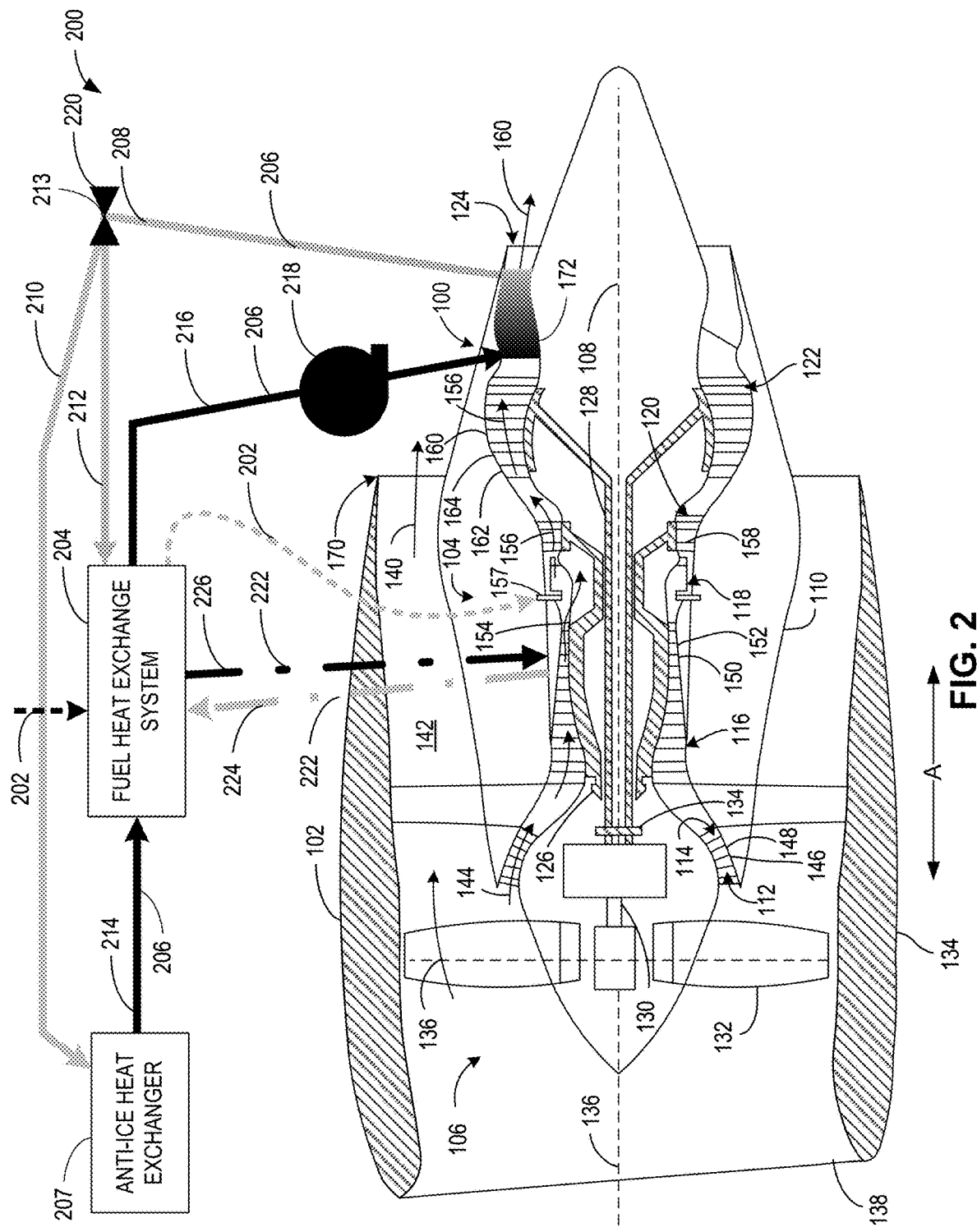
FIG. 2 is a schematic cross-sectional view of an example implementation of the anti-ice system of FIG. 1.

Referring now to the illustrated example of FIG. 2, the anti-ice system 200 includes a fuel conduit 202 that carries the fuel from a fuel supply to a fuel heat exchange system 204 in which the fuel is heated and/or pressurized before being injected into the combustor 118 by the nozzles 157. Accordingly, a first portion of the fuel conduit 202 carries the fuel at a relatively cold temperature from the fuel supply (not shown) to the fuel heat exchange system 204 in which the fuel receives heat. Further, a second portion of the fuel conduit 202 carries the heated fuel from the fuel heat exchange system 204 to the nozzles 157. The fuel heat exchange system 204 is an example implementation of the supplemental heat exchange system 26 of FIG. 1.

In the illustrated example of FIG. 2, the anti-ice system 200 includes a thermal transfer fluid conduit 206, which can also be referred to as a "thermal transfer bus." In the illustrated example of FIG. 2, the thermal transfer fluid conduit 206 is operatively coupled to the waste heat recovery heat exchanger 172, the fuel heat exchange system 204, and an anti-ice heat exchanger 207. The anti-ice heat exchanger 207 is an example implementation of the anti-ice heat exchanger 22 of FIG. 1. As such, the thermal transfer fluid conduit 206 carries the thermal transfer fluid to the waste heat recovery heat exchanger 172, the fuel heat exchange system 204, and the anti-ice heat exchanger 207 in which the thermal transfer fluid transfers heat to or absorbs heat from another fluid. Specifically, the waste heat recovery heat exchanger 172 causes the thermal transfer fluid to absorb heat from exhaust gases (e.g., the combustion gases 156 in the exhaust section 124); the fuel heat exchange system 204 causes the thermal transfer fluid to transfer heat to the fuel; and the anti-ice heat exchanger 207 causes the thermal transfer fluid to transfer heat to a portion of the aircraft 10, such as the wings 14, to prevent ice formation and/or melt accumulated ice.

In the illustrated example of FIG. 2, the thermal transfer fluid conduit 206 includes a heat supply portion 208 coupled to an outlet of the waste heat recovery heat exchanger 172. The heat supply portion 208 includes a first supply branch 210 and a second supply branch 212. The first supply branch 210 and the second supply branch 212 are distinct (e.g., defined by different portions of the thermal transfer fluid conduit 206). Specifically, the first supply branch 210 and the second supply branch 212 connect at and extend from a junction 213 in the heat supply portion 208 between the outlet of the waste heat recovery heat exchanger 172 and the fuel heat exchange system 204 and the anti-ice heat exchanger 207. Advantageously, separating the first supply branch 210 and the second supply branch 212 at the junction 213, as opposed to having two conduits coupled to two different outlets of the waste heat recovery heat exchanger 172, reduces a size and/or a weight of the heat supply portion 208 and, thus, the anti-ice system 200.

The first supply branch 210 carries the thermal transfer fluid to the anti-ice heat exchanger 207. The second supply branch 212 carries the thermal transfer fluid to the fuel heat exchange system 204. Accordingly, the anti-ice system 200 enables the waste heat absorbed by the thermal transfer fluid in the waste heat recovery heat exchanger 172 to be transferred to (i) the fuel to enable the fuel to be adjusted from a colder storage temperature to a hotter combustion temperature and (ii) the portion of the aircraft 10 to prevent ice formation and/or melt accumulated ice.

The first supply branch 210 and the second supply branch 212 are distinct to maximize or otherwise increase a temperature of the thermal transfer fluid supplied to the fuel heat exchange system 204 and the anti-ice heat exchanger 207. Specifically, heat transferred from the thermal transfer fluid to the fuel and the portion of the aircraft 10 is directly related to a temperature difference between (i) the thermal transfer fluid and (ii) the fuel and the portion of the aircraft 10. As such, the first supply branch 210 maximizes or otherwise increases a temperature difference between a first portion of the thermal transfer fluid delivered to the anti-ice heat exchanger 207 and the portion of the aircraft 10 associated with the anti-ice heat exchanger 207 to maximize or otherwise increase heat transferred to the portion of the aircraft 10. Similarly, the second supply branch 212 maximizes or otherwise increases a temperature difference between a second portion of the thermal transfer fluid delivered to the fuel heat exchange system 204 and the fuel that the fuel heat exchange system 204 receives to maximize or otherwise increase heat transferred to the fuel.

In the illustrated example of FIG. 2, the thermal transfer fluid conduit 206 also includes a first return portion 214 and a second return portion 216. The first return portion 214 and the second return portion 216 are distinct (e.g., defined by different portions of the thermal transfer fluid conduit 206).

The first return portion 214 carries the first portion of the thermal transfer fluid from the anti-ice heat exchanger 207 to the fuel heat exchange system 204 after the thermal transfer fluid flows through the anti-ice heat exchanger 207 and heats the associated portion of the aircraft 10.

The second return portion 216 carries the first and second portion of the thermal transfer fluid from the fuel heat exchange system 204 to the waste heat recovery heat exchanger 172. In some examples, carrying the thermal transfer fluid to the fuel heat exchange system 204 after the thermal transfer fluid cools the portion of the aircraft 10 enables the anti-ice system 200 to manage a temperature of the fuel. In some examples, carrying the thermal transfer fluid to the fuel heat exchange system 204 and/or the second return portion 216 after the thermal transfer fluid cools the portion of the aircraft 10, as opposed to carrying the thermal transfer fluid directly to the waste heat recovery heat exchanger 172, reduces a size and/or weight of the anti-ice system 200, which helps improve a fuel efficiency of the engine 100 and provides more space for hardware that supports the operations of the engine 100 and/or the aircraft 10.

In the illustrated example of FIG. 2, the anti-ice system 200 includes a pump 218 (e.g., a compressor) and one or more valves 220 operatively coupled to the conduit 206 to control a flow direction and/or rate of the thermal transfer fluid. In some examples, the pump 218 and the valves 220 are activated by a cockpit switch at the discretion of an operator (e.g., a pilot) to turn on anti-ice functionality when flying in inclement weather. In some examples, the pump 218 and the valves 220 are activated based on a sensed ambient temperature of the engine inlet air, an ambient pressure, and/or an altitude indication, which can indicate a potential for icing conditions.

When activated, the pump 218 drives the thermal transfer fluid through the thermal transfer fluid conduit 206 and, thus, controls a flow rate of the thermal transfer fluid in at least a portion of the thermal transfer fluid conduit 206. A position of the valves 220 can be adjusted to help control the flow rate and/or direction of the thermal transfer fluid in the conduit 206. For example, the valves 220 can be adjusted to control a ratio of the thermal transfer fluid that flows through the first supply branch 210 relative to the second supply branch 212 based on a temperature of the fuel, an ambient temperature encountered by and/or expected to be encountered by the aircraft 10, and/or a temperature of the portion of the aircraft 10. Additionally or alternatively, the valves 220 can be adjusted to cause the first portion of the thermal transfer fluid to flow from the anti-ice heat exchanger 207 to (i) the upstream portion of the fuel heat exchange system 204, (ii) the downstream portion of the fuel heat exchange system 204, and/or to the second return portion 216 (e.g., bypassing the fuel heat exchange system 204).

The pump 218 and/or the valves 220 can include and/or be instantiated (e.g., creating an instance of, bring into being for any length of time, materialize, implement, etc.) by programmable circuitry such as a Central Processor Unit (CPU) executing first instructions. Additionally or alternatively, the pump 218 and/or the valves 220 may include and/or be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions.

In the illustrated example of FIG. 2, the anti-ice system 200 includes a bleed air conduit 222 operatively coupled to the high-pressure compressor section 116 and the fuel heat exchange system 204. Specifically, the bleed air conduit 222 includes a supply portion 224 that carries compressed and, in turn, heated bleed air from the compressor section 116 to the fuel heat exchange system 204. As such, the bleed air can supply heat to the fuel, in addition to the thermal transfer fluid. The fuel heat exchange system 204 is structured to keep the thermal transfer fluid, the fuel, and the bleed air fluidly separate while enabling the fuel to absorb heat from the thermal transfer fluid and the bleed air. In some examples, the fuel heat exchange system 204 is a plate heat exchanger. In some examples, the fuel heat exchange system 204 is a shell and tube heat exchanger or another suitable heat exchanger to facilitate the heat transfer between the fuel and the thermal transfer fluid and the bleed air.

Further, the bleed air conduit 222 includes a return portion 226 that carries the cooled bleed air from the fuel heat exchange system 204 back to the compressor section 116. Cooling the bleed air provides additional cooling to hot-section components, such as a disk and/or blade of the HPT turbine 120, so that such components can survive hotter/harsher conditions that come with advanced cycles. In some examples, cooling the bleed air reduces a risk of knocking (e.g., premature ignition of the mixture of fuel and the compressed air 154) and reduces exhaust emissions. Additionally, the cooled bleed air has an increased density, which improves a combustion efficiency and enables the engine 100 to achieve an increased power output.

In some examples, the first return portion 214 routes the first portion of the thermal transfer fluid to an upstream section of the fuel heat exchange system 204 to heat the fuel before the second portion of the thermal transfer fluid that the fuel heat exchange system 204 receives from the second supply branch 212. As such, the first portion of the thermal transfer fluid can increase an initial temperature of the fuel that the second portion of the thermal transfer fluid heats to maximize or otherwise increase a temperature to which the second portion of the thermal transfer fluid can heat the fuel. In some examples, the first return portion 214 routes the first portion of the thermal transfer fluid to a downstream section of the fuel heat exchange system 204 to cool the fuel and prevent premature ignition as a result of the heat received from the second portion of the thermal transfer fluid. As such, the first portion of the thermal transfer fluid can prevent overheating and premature combustion. In some examples, the first return portion 214 bypasses the second fuel heat exchange system 204 and carries the first portion of the thermal transfer fluid to the second return portion 216 after the thermal transfer fluid flows through the anti-ice heat exchanger 207 and heats the associated portion of the aircraft 10.

In some examples, because the second portion of the thermal transfer fluid typically has a higher temperature than the bleed air, the fuel heat exchange system 204 is configured to cause the bleed air to transfer heat to the fuel upstream of the second portion of the thermal transfer fluid. In some examples, when the first portion of the thermal transfer fluid has a lower temperature than the bleed air, the fuel heat exchange system 204 is configured to cause the fuel to receive heat from the first portion of the thermal transfer fluid, then the bleed air, then the second portion of the thermal transfer fluid. The fuel heat exchange system 204 can include pipe(s), plate(s), baffle(s), fin(s), and/or other components to facilitate the heat transfer between the fuel, the thermal transfer fluid and the bleed air.

Figure 3:
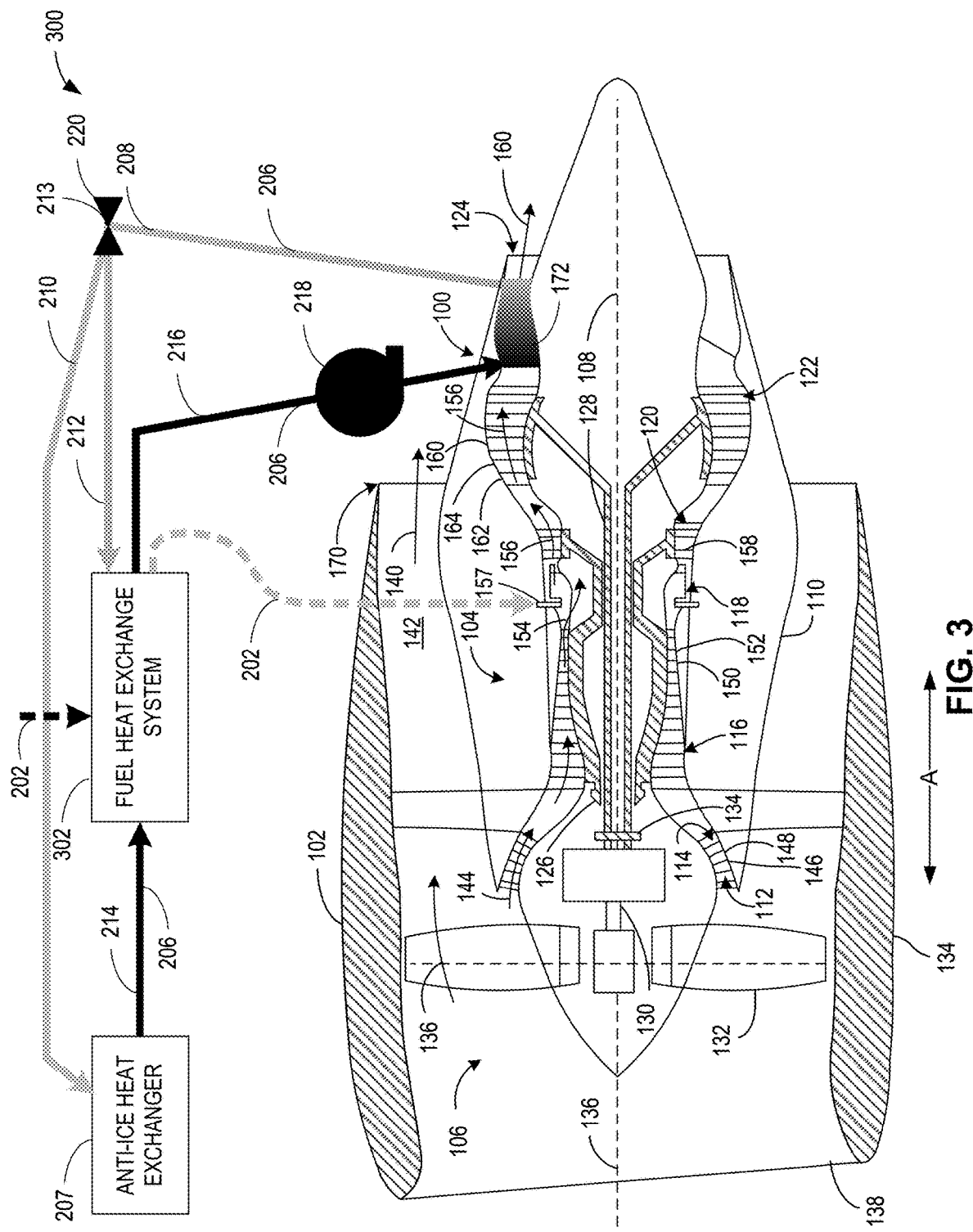
FIG. 3 is another schematic cross-sectional view of an example implementation of the anti-ice system of FIG. 1.

FIG. 3 is another schematic cross-sectional view of the engine 100 including another example anti-ice system 300. The anti-ice system 300 of FIG. 3 is similar to the anti-ice system 200 of FIG. 2. However, the anti-ice system 300 of FIG. 3 does not include the bleed air conduit 222. As such, the anti-ice system 300 of FIG. 3 includes a fuel heat exchange system 302, which is structured differently from the fuel heat exchange system 204 of FIG. 2 because the fuel heat exchange system 302 of FIG. 3 facilitates a thermal energy exchange between the fuel and the thermal transfer fluid without providing a separate fluid section for the bleed air. As such, a size and/or a weight of the anti-ice system 300 can be reduced relative to the anti-ice system 200 of FIG. 2. Other aspects disclosed in connection with FIG. 2 apply to the example of FIG. 3.

Figure 4:
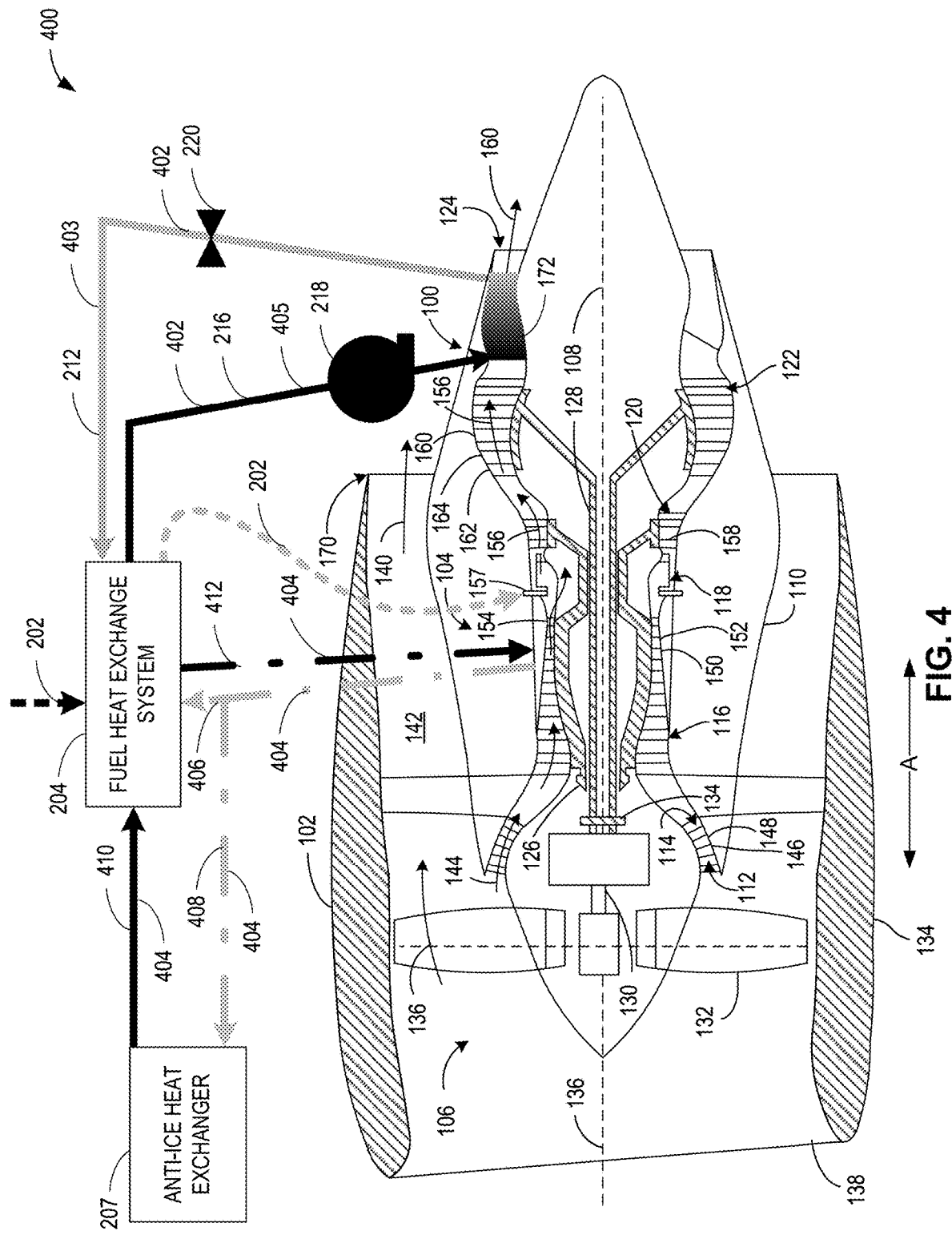
FIG. 4 is another schematic cross-sectional view of an example implementation of the anti-ice system of FIG. 1.

FIG. 4 is another schematic cross-sectional view of the engine 100 including another example anti-ice system 400. The anti-ice system 400 of FIG. 4 is similar to the anti-ice system 200 of FIG. 2. However, the anti-ice system 400 of FIG. 4 includes a thermal transfer fluid conduit 402 and a bleed air conduit 404 that differ from the thermal transfer fluid conduit 206 and the bleed air conduit 222 of FIG. 2. Specifically, the thermal transfer fluid conduit 402 includes a supply portion 403 that includes the second supply branch 212 but does not include the first supply branch 210 of FIG. 2, which carries the thermal transfer fluid to the anti-ice heat exchanger 207. Further, the thermal transfer fluid conduit 402 includes a return portion 405 that includes the second return portion 216, which carries the thermal transfer fluid from the fuel heat exchange system 204 to the waste heat recovery heat exchanger 172 after the thermal transfer fluid heat the fuel, but not the first return portion 214 of FIG. 2. In some examples, the anti-ice system 400 of FIG. 4 is advantageous when a volume of the thermal transfer fluid onboard the aircraft 10 is limited.

In the illustrated example of FIG. 4, the bleed air conduit 404 includes a first supply branch 406 and a second supply branch 408. The first supply branch 406 carries the bleed air to the fuel heat exchange system 204, similar to the supply portion 224 of the bleed air conduit 222 of FIG. 2. The second supply branch 408 carries the bleed air to the anti-ice heat exchanger 207. As such, in the illustrated example of FIG. 4, the bleed air, not the thermal transfer fluid, heats the portion of the aircraft 10 to prevent ice formation and/or melt accumulated ice. In some examples, the bleed air conduit 404 does not include the first supply branch 406 such that the thermal transfer fluid is dedicated to heating the fuel and the bleed air is dedicated to heating the portion of the aircraft 10.

Further, the bleed air conduit 404 includes a first return portion 410 and a second return portion 412. The first return portion 410 carries the bleed air from the anti-ice heat exchanger 207 to the fuel heat exchange system 204 and/or the second return portion 412 after the bleed air flows through the anti-ice heat exchanger 207 and heats the associated portion of the aircraft 10. The second return portion 412 carries the bleed air from the fuel heat exchange system 204 back to the HP compressor 116. In some examples, carrying the bleed air to the fuel heat exchange system 204 after the bleed air cools the portion of the aircraft 10 enables the anti-ice system 200 to manage a temperature of the fuel and prevent overheating, which can otherwise lead to coke formation and/or premature combustion. In some examples, carrying the bleed air to the second return portion 412 after the thermal transfer fluid cools the portion of the aircraft 10, as opposed to carrying the bleed air directly to the HP compressor 116 in parallel with the second return portion 412, reduces a size and/or weight of the anti-ice system 200, which helps improve a fuel efficiency of the engine 100 and provides more space for hardware that supports the operations of the engine 100 and/or the aircraft 10.

Figure 5:
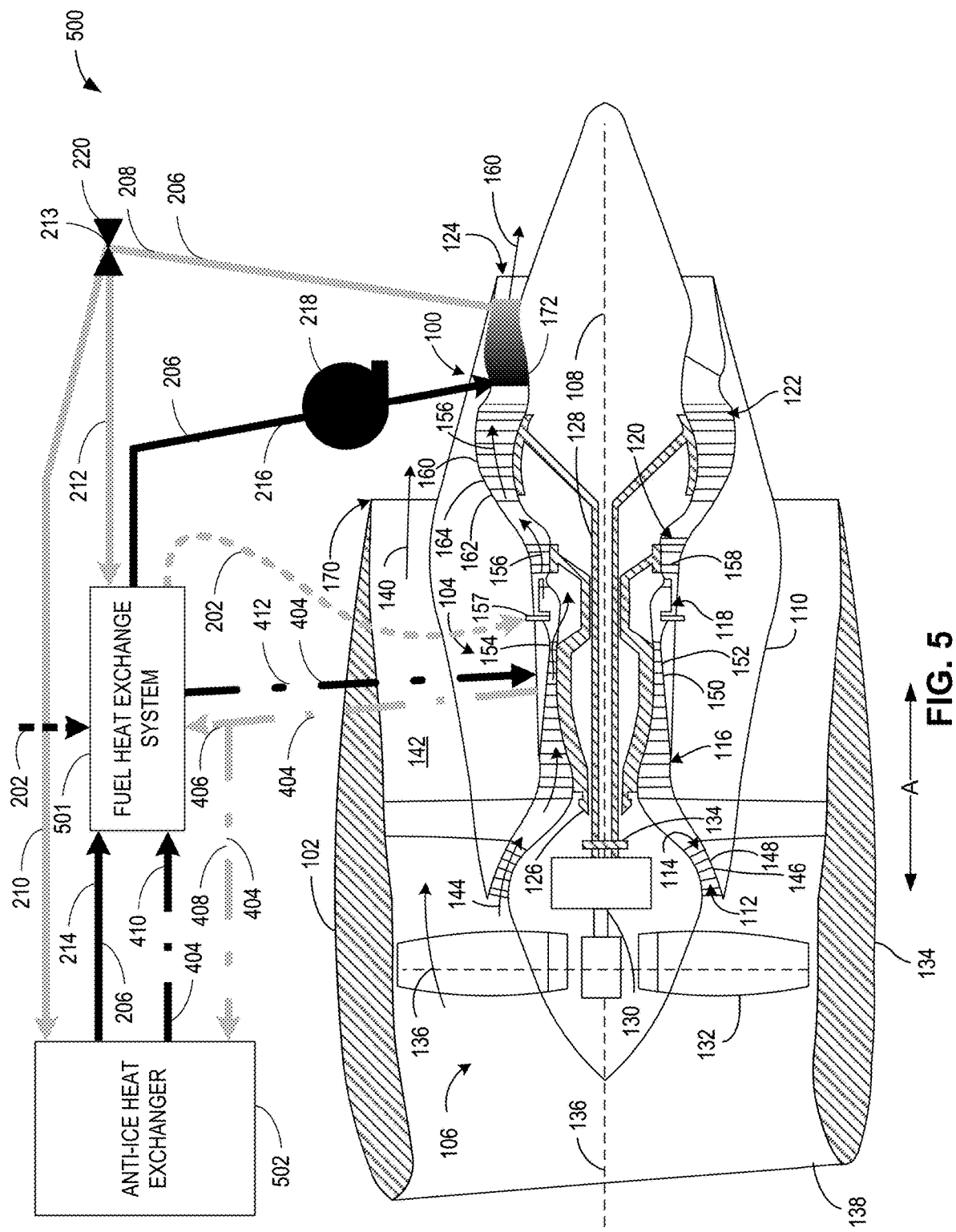
FIG. 5 is another schematic cross-sectional view of an example implementation of the anti-ice system of FIG. 1.

FIG. 5 is another schematic cross-sectional view of the engine 100 including another example anti-ice system 500. The anti-ice system 500 of FIG. 5 is similar to the anti-ice system 200 of FIG. 2. However, the anti-ice system of FIG. 5 includes the bleed air conduit 404 introduced in FIG. 4. As such, in the illustrated example of FIG. 5, both the thermal transfer fluid and the bleed air heat both the fuel in a fuel heat exchange system 501 and the portion of the aircraft 10 in an anti-ice heat exchanger 502. Specifically, the anti-ice heat exchanger 502 is representative of another example implementation of the anti-ice heat exchanger 22 of FIG. 1 that differs from the anti-ice heat exchanger 207 of FIGS. 2-4 as the anti-ice heat exchanger 502 of FIG. 5 is structured to cause two separate fluids, the thermal transfer fluid and the bleed air, to heat the portion of the aircraft 10 to prevent ice formation and/or melt accumulated ice. Similarly, the fuel heat exchange system 501 of FIG. 5 is representative of another example implementation of the supplemental heat exchange system 26 of FIG. 1 that differs from the fuel heat exchange system 204 of FIG. 2 as the fuel heat exchange system 501 is structured to receive both the thermal transfer fluid and the bleed air after the thermal transfer fluid and the bleed air heat the portion of the aircraft 10 associated with the anti-ice heat exchanger 502. In some examples, the bleed air or the thermal transfer fluid—and not both fluids—is supplied to the fuel heat exchange system 501 to heat the fuel. For example, the fuel heat exchange system 501 can be replaced by the fuel heat exchange system 302 of FIG. 3.

Figure 6:
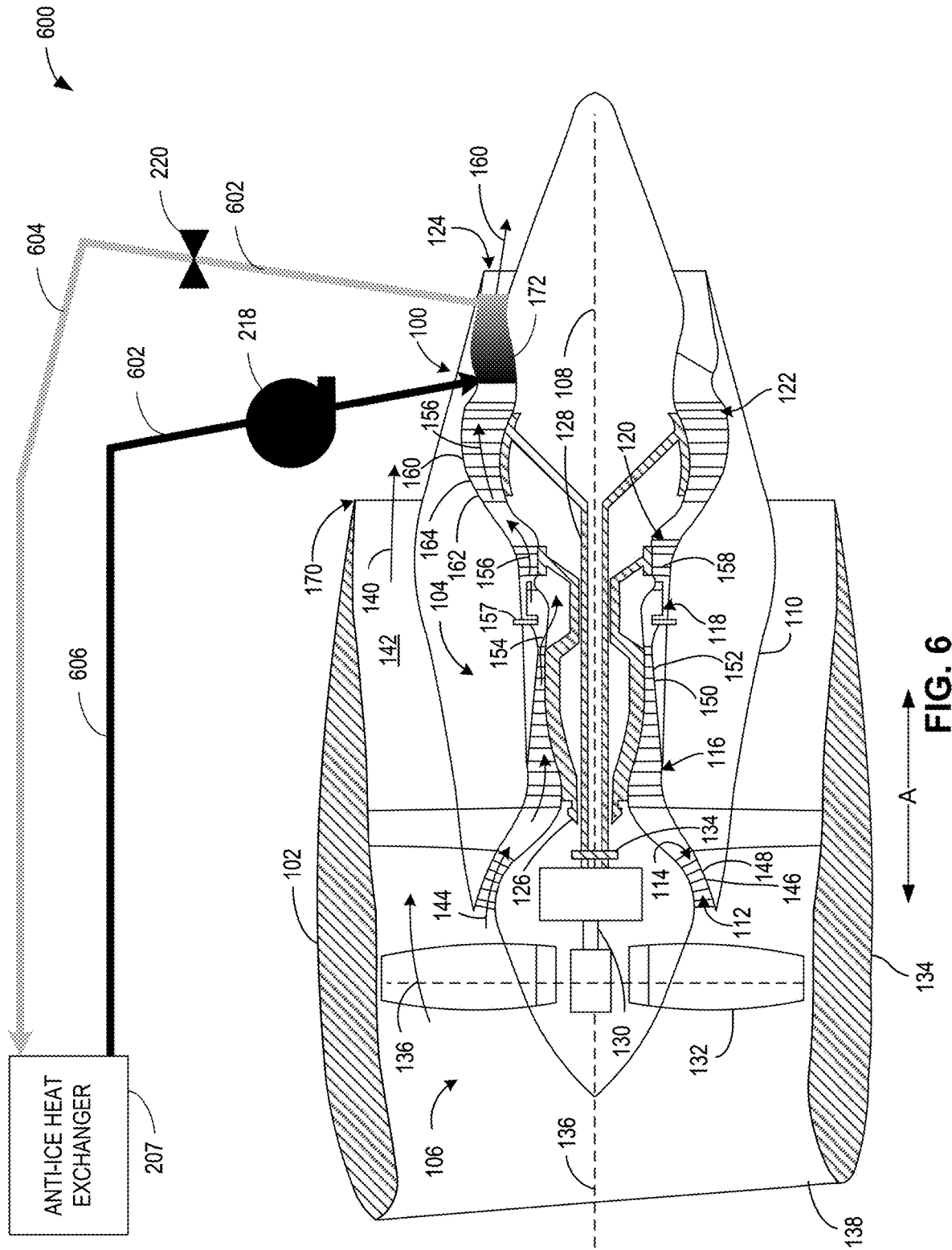
FIG. 6 is another schematic cross-sectional view of an example implementation of the anti-ice system of FIG. 1.

FIG. 6 is another schematic cross-sectional view of the engine 100 including another example anti-ice system 600. The anti-ice system 600 of FIG. 6 is similar to the anti-ice system 200 of FIG. 2. However, the anti-ice system 600 of FIG. 6 does not include the fuel conduit 202, the fuel heat exchange system 204, the second supply branch 212 of the thermal transfer fluid conduit 206, and the bleed air conduit 222. In the illustrated example of FIG. 6, the anti-ice system 600 includes another example thermal transfer fluid conduit 602 that carries the thermal transfer fluid between the waste heat recovery heat exchanger 172 and the anti-ice heat exchanger 207 to enable the thermal transfer fluid to heat the portion of the aircraft 10 to prevent ice formation and/or melt accumulated ice. Accordingly, the thermal transfer fluid conduit 602 of FIG. 6 includes a supply portion 604 (e.g., the first supply branch 210) that carries the thermal transfer fluid directly from the waste heat recovery heat exchanger to the anti-ice heat exchanger 207. Further, the thermal transfer fluid conduit 602 of FIG. 6 includes a return portion 606 that carries the thermal transfer fluid directly from the anti-ice heat exchanger 207 to the waste heat recovery heat exchanger 172.

In some examples, a fuel supply associated with the engine 100 stores the fuel at a temperature sufficient for combustion such that the fuel heat exchange system 204 is not needed. For example, when the engine 100 utilizes Jet-A fuel, a fuel supply can store the Jet-A fuel at a temperature that removes a need for the fuel to be heated between the fuel supply and the combustor 118. As such, a size and/or weight of the anti-ice system 600 is reduced relative to the anti-ice systems 200, 300, 400, 500 of FIGS. 2, 3, 4, and/or 5. In some examples, bleed air heats the fuel associated with the engine 100 utilized in conjunction with the anti-ice system 600 of FIG. 6. In such examples, the anti-ice system 600 includes the fuel conduit 202 and the bleed air conduit 222 of FIG. 2 and a fuel heat exchange system structured to cause the bleed air to heat the fuel.

Figure 7:
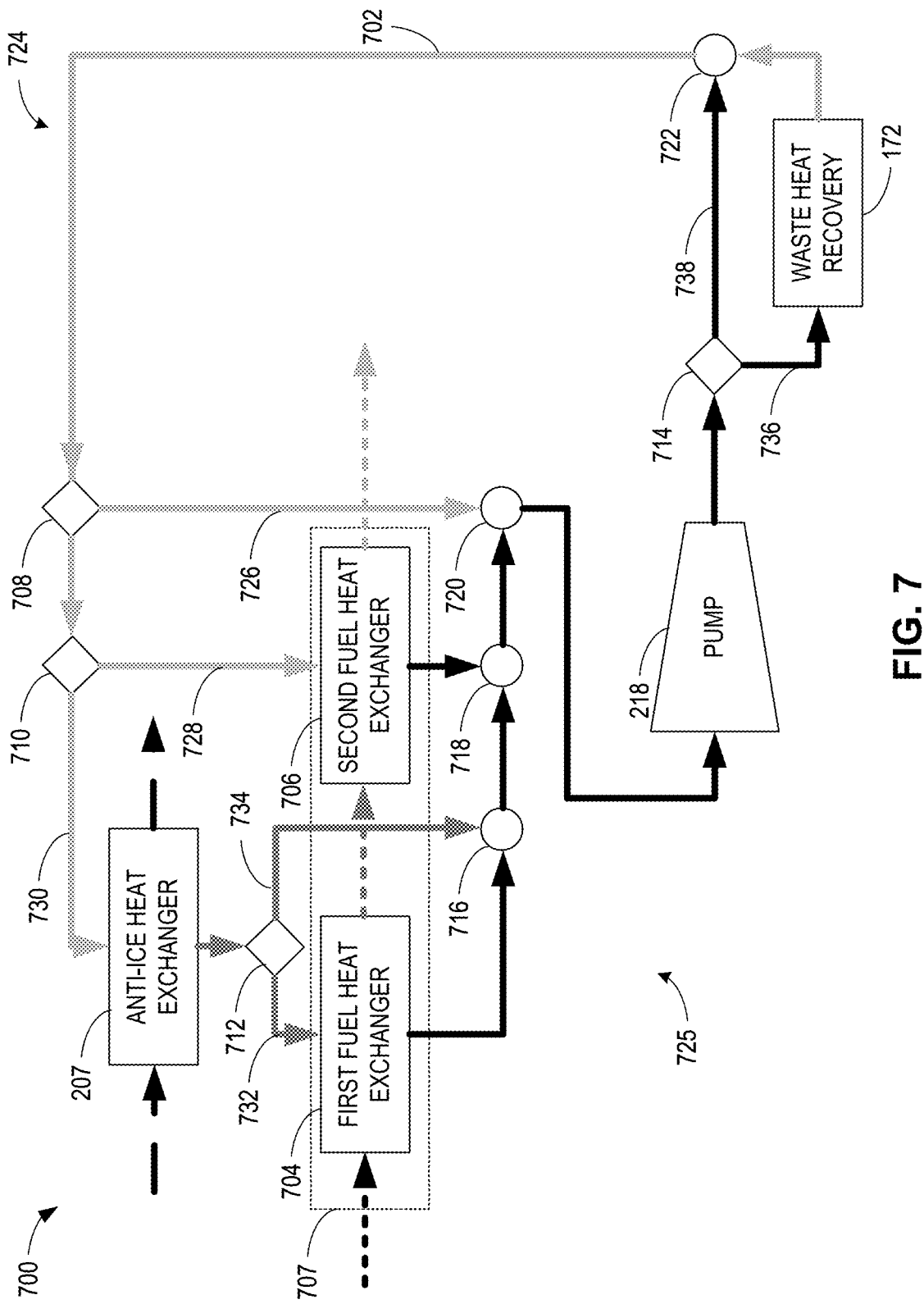
FIG. 7 is a schematic representation of another example implementation of the anti-ice system of FIG. 1.

FIG. 7 is a schematic representation of another example anti-ice system 700 (e.g., a TTB or a system including a TTB) that can be utilized in connection with the engine 100 of FIGS. 1-6. In the illustrated example of FIG. 7, the anti-ice system 700 includes the waste heat recovery heat exchanger 172, the anti-ice heat exchanger 207, the pump 218, a thermal transfer fluid conduit 702, a first fuel heat exchanger 704, and a second fuel heat exchanger 706. The first fuel heat exchanger 704 and the second fuel heat exchanger 706 form at least a portion of a fuel heat exchange system 707 (e.g., the fuel heat exchange system 204, 302, 501 of FIGS. 2, 3, 4, and/or 5). The anti-ice system 700 of FIG. 7 also includes a first split valve 708, a second split valve 710, a third split valve 712, a fourth split valve 714, a first fluid mixer 716, a second fluid mixer 718, a third fluid mixer 720, and a fourth fluid mixer 722 operatively coupled to the thermal transfer fluid conduit 702. The anti-ice system 700 of FIG. 7 does not utilize compressor bleed air to heat fuel nor a portion of the aircraft 10 associated with the anti-ice heat exchanger 207. Instead, the anti-ice system 700 relies on the thermal transfer fluid to supply heat to the fuel and the portion of the aircraft 10 associated with the anti-ice heat exchanger 207.

In the illustrated example of FIG. 7, the thermal transfer fluid conduit 702 includes a heat supply portion 724 and a return portion 725. The heat supply portion 724 is coupled to an outlet of the waste heat recovery heat exchanger 172, and the return portion 725 is coupled to an inlet of the waste heat recovery heat exchanger 172.

In the illustrated example of FIG. 7 the heat supply portion 724 includes a first branch 726, a second branch 728, and a third branch 730. In the illustrated example of FIG. 7, the thermal transfer fluid that flows through the first branch 726 bypasses the anti-ice heat exchanger 207, the first fuel heat exchanger 704, and the second fuel heat exchanger 706 and flows to the third fluid mixer 720. The thermal transfer fluid that flows through the second branch 728 heats fuel in the second fuel heat exchanger 706. The thermal transfer fluid that flows through the third branch 730 heats the portion of the aircraft 10 associated with the anti-ice heat exchanger 207.

The first split valve 708 controls a flow rate of the thermal transfer fluid through the first branch 726. For example, the first split valve 708 controls whether and/or how much the thermal transfer fluid bypasses the anti-ice heat exchanger 207, the first fuel heat exchanger 704, and the second fuel heat exchanger 706. In some examples, a position of the first split valve 708 is based on a temperature of the thermal transfer fluid, an ambient temperature encountered by the portion of the aircraft 10 associated with the anti-ice heat exchanger 207, and/or a temperature of the fuel downstream of the second fuel heat exchanger 706. For example, the first split valve 708 can cause a portion of the thermal transfer fluid to flow through the first branch 726 to maintain a state (e.g., a phase) of the thermal transfer fluid (e.g., in a supercritical state, in a liquid state, in a gaseous state).

The second split valve 710 controls flow rates of the thermal transfer fluid through the second branch 728 and the third branch 730. For example, the second split valve 710 controls a percentage of the thermal transfer fluid that heats the portion of the aircraft 10 via the anti-ice heat exchanger 207 and a percentage of the thermal transfer fluid that is dedicated to heat the fuel via the second fuel heat exchanger 706. In some examples, a position of the second split valve 710 is based on the ambient temperature encountered by the portion of the aircraft 10 associated with the anti-ice heat exchanger 207, a temperature of the fuel upstream of the second fuel heat exchanger 706, and/or the temperature of the fuel downstream of the second fuel heat exchanger 706.

In the illustrated example of FIG. 7, the return portion 725 of the thermal transfer fluid conduit 702 includes a fourth branch 732, a fifth branch 734, a sixth branch 736, and a seventh branch 738. The thermal transfer fluid that flows through the fourth branch 732 heats fuel in the first fuel heat exchanger 704 after heating the portion of the aircraft 10 associated with the anti-ice heat exchanger 207. The thermal transfer fluid that flows through the fifth branch 734 bypasses the first fuel heat exchanger 704 after heating the portion of the aircraft 10 associated with the anti-ice heat exchanger 207. The thermal transfer fluid that flows through the sixth branch 736 flows to the inlet of the waste heat recovery heat exchanger 172. The thermal transfer fluid that flows through the seventh branch 738 bypasses the waste heat recovery heat exchanger 172 before en route from the return portion 725 to the heat supply portion 724.

In the illustrated example of FIG. 7, the third split valve 712 controls flow rates of the thermal transfer fluid through the fourth branch 732 and the fifth branch 734. For example, the third split valve 712 controls whether and/or how much of the thermal transfer fluid heats the fuel via the first fuel heat exchanger 704 after heating the portion of the aircraft 10 associated with the anti-ice heat exchanger 207. In some examples, a position of the third split valve 712 is based on a temperature of the fuel upstream of the first fuel heat exchanger 704, a temperature of the fuel between the first fuel heat exchanger 704 and the second fuel heat exchanger 706, and/or a temperature of the fuel downstream of the second fuel heat exchanger 706.

In the illustrated example of FIG. 7, the first fuel heat exchanger 704 heats fuel upstream of the second fuel heat exchanger 706. As such, the first fuel heat exchanger 704 can increase the temperature of the fuel from a first temperature to a second temperature greater than the first temperature. Further, the second fuel heat exchanger 706 can increase the temperature of the fuel from the second temperature to a third temperature greater than the second temperature.

In the illustrated example of FIG. 7, the first fluid mixer 716 facilitates mixing of the thermal transfer fluid that passed through the fourth branch 732 and the first fuel heat exchanger 704 with the thermal transfer fluid that bypassed the first fuel heat exchanger 704 via the fifth branch 734. The second fluid mixer 718 facilitates mixing of the thermal transfer fluid that passed through the second branch 728 and heated the fuel via the second fuel heat exchanger 706 with the thermal transfer fluid that passed through the first fluid mixer 716. Further, the third fluid mixer 720 facilitates mixing of the thermal transfer fluid that passed through the first branch 726 with the thermal transfer fluid that passed through the second fluid mixer 718.

In the illustrated example of FIG. 7, the pump 218 is operatively coupled to the return portion 725 and drives the thermal transfer fluid between the third fluid mixer 720 and the fourth split valve 714. In the illustrated example of FIG. 7, the fourth split valve 714 controls flow rates of the thermal transfer fluid flow through the sixth branch 736 and the seventh branch 738. For example, the fourth split valve 714 controls a percentage of the thermal transfer fluid that absorbs heat in the waste heat recovery heat exchanger 172 before returning to the heat supply portion 724 of the conduit 702. In some examples, a position of the fourth split valve 714 is based on a temperature of the thermal transfer fluid immediately upstream of the waste heat recovery heat exchanger 172, a temperature of the thermal transfer fluid immediately downstream of the waste heat recovery heat exchanger, the ambient temperature encountered by the portion of the aircraft 10 associated with the anti-ice heat exchanger 207, the temperature of the fuel upstream of the first fuel heat exchanger 704, and/or the temperature of the fuel downstream of the second fuel heat exchanger 706.

In the illustrated example of FIG. 7, the fourth fluid mixer 722 facilitates mixing of the thermal transfer fluid that passed through the sixth branch 736 and was heated in the waste heat recovery heat exchanger 172 with the thermal transfer fluid that passed through the seventh branch 738 and bypassed the waste heat recovery heat exchanger 172. The first fluid mixer 716, the second fluid mixer 718, the third fluid mixer 720, and the fourth fluid mixer 722 can include a direct valve to pipe mixer, a feed tank, and/or a turbulator. Specifically, a turbulator can include fins, twisted tapes, ribs, and/or other protrusions inside the thermal transfer fluid conduit 702 to disturb the flow, which causes different portions of the thermal transfer fluid having different temperatures to mix. As such, the mixers 716, 718, 720, 722 increase a convective heat transfer rate and improve a uniformity (e.g., a consistency) of a temperature of different portions of the thermal transfer fluid that flowed to different areas of the anti-ice system 700.

The first split valve 708, the second split valve 710, the third split valve 712, and/or the fourth split valve 714 can include and/or be instantiated (e.g., creating an instance of, bring into being for any length of time, materialize, implement, etc.) by programmable circuitry such as a CPU executing first instructions. Additionally or alternatively, the first split valve 708, the second split valve 710, the third split valve 712, and/or the fourth split valve 714 may include and/or be instantiated (e.g., creating an instance of, bring into being for any length of time, materialize, implement, etc.) by (i) an ASIC and/or (ii) a FPGA structured and/or configured in response to execution of second instructions to perform operations corresponding to the first instructions.

Advantageously, the anti-ice system 700 of FIG. 7 enables the fuel and/or the portion of the aircraft 10 associated with the anti-ice heat exchanger 207 to be heated without utilization of compressor bleed air. As a result, the anti-ice system 700 can enable a size and/or a weight of the anti-ice system to be reduced. Additionally, minimizing or otherwise reducing compressor flow extraction (e.g., enabling a reduced flow extraction rate) can improve an efficiency of the engine 100. Additionally, the anti-ice system 700 enables precise control of a temperature of the thermal transfer fluid, the fuel, the bleed air, and the portion of the aircraft 10 associated with the anti-ice heat exchanger 207.

Figure 8:
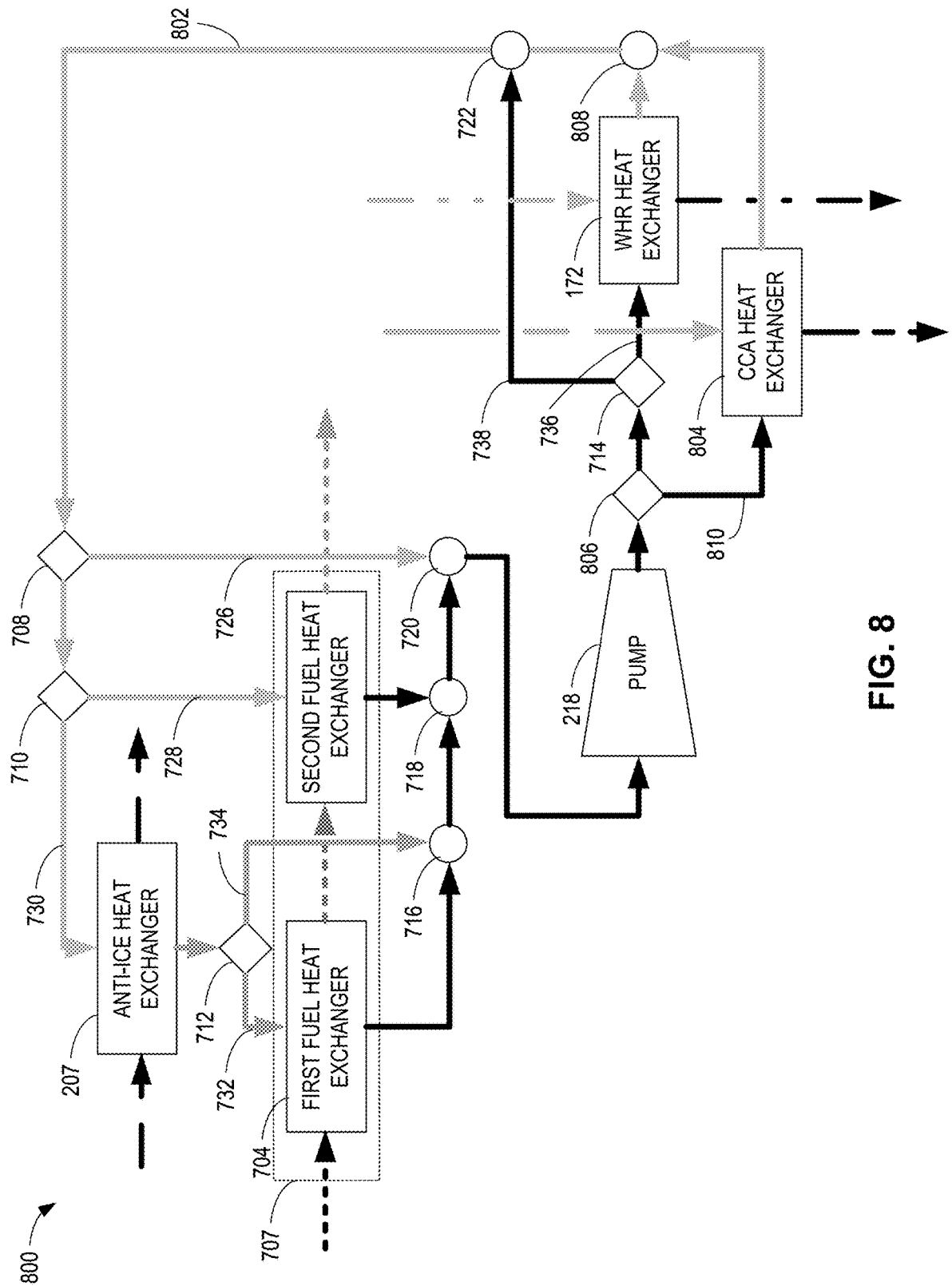
FIG. 8 is another schematic representation of another example implementation of the anti-ice system of FIG. 1.

FIG. 8 is a schematic representation of another example anti-ice system 800 (e.g., a TTB or a system including a TTB). The anti-ice system 800 of FIG. 8 includes a thermal transfer fluid conduit 802 operatively coupled to the waste heat recovery (WHR) heat exchanger 172, the anti-ice heat exchanger 207, the pump 218, the first fuel heat exchanger 704, and the second fuel heat exchanger 706, the first split valve 708, the second split valve 710, the third split valve 712, the fourth split valve 714, the first fluid mixer 716, the second fluid mixer 718, the third fluid mixer 720, and the fourth fluid mixer 722. As such, the thermal transfer fluid conduit 802 includes the first branch 726, the second branch 728, the third branch 730, the fourth branch 732, the fifth branch 734, the sixth branch 736, and the seventh branch 738 discussed in association with FIG. 7. In the illustrated example of FIG. 8, the anti-ice system 800 also includes a cooled cooling air (CCA) heat exchanger 804, a fifth split valve 806, and a fifth fluid mixer 808.

In the illustrated example of FIG. 8, the CCA heat exchanger 804 is operatively coupled to an eighth branch 810 of the thermal transfer fluid conduit. The fifth split valve 806 controls a flow rate of the thermal transfer fluid that flows through the eighth branch 810 and, in turn, to the CCA heat exchanger 804 in which the thermal transfer fluid absorbs heat from compressor bleed air that is then return to a compressor section (e.g., the compressor section 116 of the engine 100). For example, a position implemented by the fifth split valve 806 can be based on a temperature of the thermal transfer fluid, a temperature of the air in the compressor section, a temperature of the fuel upstream of the first fuel heat exchanger 704, a temperature of the fuel downstream of the second fuel heat exchanger 706, an ambient temperature, and/or a temperature of a portion of the aircraft 10 associated with the anti-ice heat exchanger 207. The fifth split valve 806 can include and/or be instantiated (e.g., creating an instance of, bring into being for any length of time, materialize, implement, etc.) by programmable circuitry such as a CPU executing first instructions. Additionally or alternatively, the fifth split valve 806 may include and/or be instantiated (e.g., creating an instance of, bring into being for any length of time, materialize, implement, etc.) by (i) an ASIC and/or (ii) a FPGA structured and/or configured in response to execution of second instructions to perform operations corresponding to the first instructions.

In the illustrated example of FIG. 8, the fifth fluid mixer 808 mixes the thermal transfer fluid that received heat in the CCA heat exchanger 804 with the thermal transfer fluid that received heat in the WHR heat exchanger 172. The fifth fluid mixer 808 can include a direct valve to pipe mixer, a feed tank, and/or a turbulator. Specifically, a turbulator can include fins, twisted tapes, ribs, and/or other protrusions inside the thermal transfer fluid conduit 702 to disturb the flow, which causes different portions of the thermal transfer fluid having different temperatures to mix. As such, the fifth fluid mixer 808 increase a convective heat transfer rate and improve a uniformity (e.g., a consistency) of a temperature of different portions of the thermal transfer fluid that flowed to different areas of the anti-ice system 700.

Advantageously, the anti-ice system 800 of FIG. 8 enables heat from the compressor bleed air to be utilized to heat the fuel and/or the portion of the aircraft 10 associated with the anti-ice heat exchanger 207 while minimizing or otherwise reducing a distance that the bleed air travels to improve an efficiency of the engine 100. For example, the anti-ice system 800 enables cooling of the bleed air with reduced flow extraction. Further, reducing the distance across which the bleed air travels reduces a size and/or a weight of the anti-ice system 800. Additionally, the anti-ice system 800 enables precise control of a temperature of the thermal transfer fluid, the fuel, the bleed air, and the portion of the aircraft 10 associated with the anti-ice heat exchanger 207.

The different examples discussed in connection with FIGS. 2-8 may be advantageous in different use cases. The larger the aircraft 10 and/or the engine 100, the greater the need for anti-ice capability as a leading edge area of the wing 14 and an engine inlet area increase in size. As such, a larger aircraft is more likely to utilize a more sophisticated and heavier anti-ice system than a smaller aircraft. Every aircraft design is a complex trade-off of many different factors that affect weight and performance. As such, different ones of the anti-ice systems 200, 300, 400, 500, 600 of FIGS. 2, 3, 4, 5 and/or 6 may be suitable for utilization in different aircrafts and/or engines based on associated conditions, circumstances, and/or constraints. For example, the anti-ice system 200 of FIG. 2 advantageously enables anti-icing to be provided solely by the thermal transfer fluid to remove a need for other fluids to be delivered to the portion of the aircraft, which would otherwise increase a size and/or a weight of the anti-ice system 200. Additionally, the anti-ice system 200 of FIG. 2 limits a distance traveled by compressor bleed air to reduce flow extraction and improve engine performance. For instance, the anti-ice system 200 removes a need for the compressor bleed air to be routed to the portion of the aircraft for anti-ice purposes. Further, the anti-ice system 200 of FIG. 2 enables adjustable fuel temperature control through supply of different portions of the thermal transfer fluid and the compressor bleed air to the fuel heat exchange system 204. The anti-ice system 300 of FIG. 3 removes compressor bleed air extraction to further reduce flow extraction from the engine and/or a size and/or a weight of the anti-ice system 300 (e.g., relative to the anti-ice system 200 of FIG. 2). The anti-ice system 400 of FIG. 4 can be advantageous when there is a limited volume of thermal transfer fluid onboard an aircraft. The anti-ice system 500 of FIG. 5 advantageously provides both the thermal transfer fluid and the compressor bleed air to the portion of the aircraft for anti-icing purposes such that the anti-ice system 500 of FIG. 5 is advantageous in especially cold environments and/or when there is a limited volume of thermal transfer fluid onboard an aircraft that is usable for anti-icing. The anti-ice systems 600, 700 of FIGS. 6 and 7 advantageously minimize or otherwise reduce a size and/or a weight of an associated aircraft and/or engine and/or reduces compressor bleed air extraction to improve engine performance. The anti-ice system 800 of FIG. 8 advantageously enables bleed air heat to be transferred to a portion of the aircraft 10 and/or fuel while minimizing or otherwise reducing a distance that the bleed air travels to reduce flow extraction from the engine 100 and improve an efficiency of the engine 100. Further, the anti-ice systems 700, 800 of FIGS. 7-8 enable precise control of a temperature of the thermal transfer fluid, the portion of the aircraft 10, the fuel, and/or the bleed air.

Figure 9:
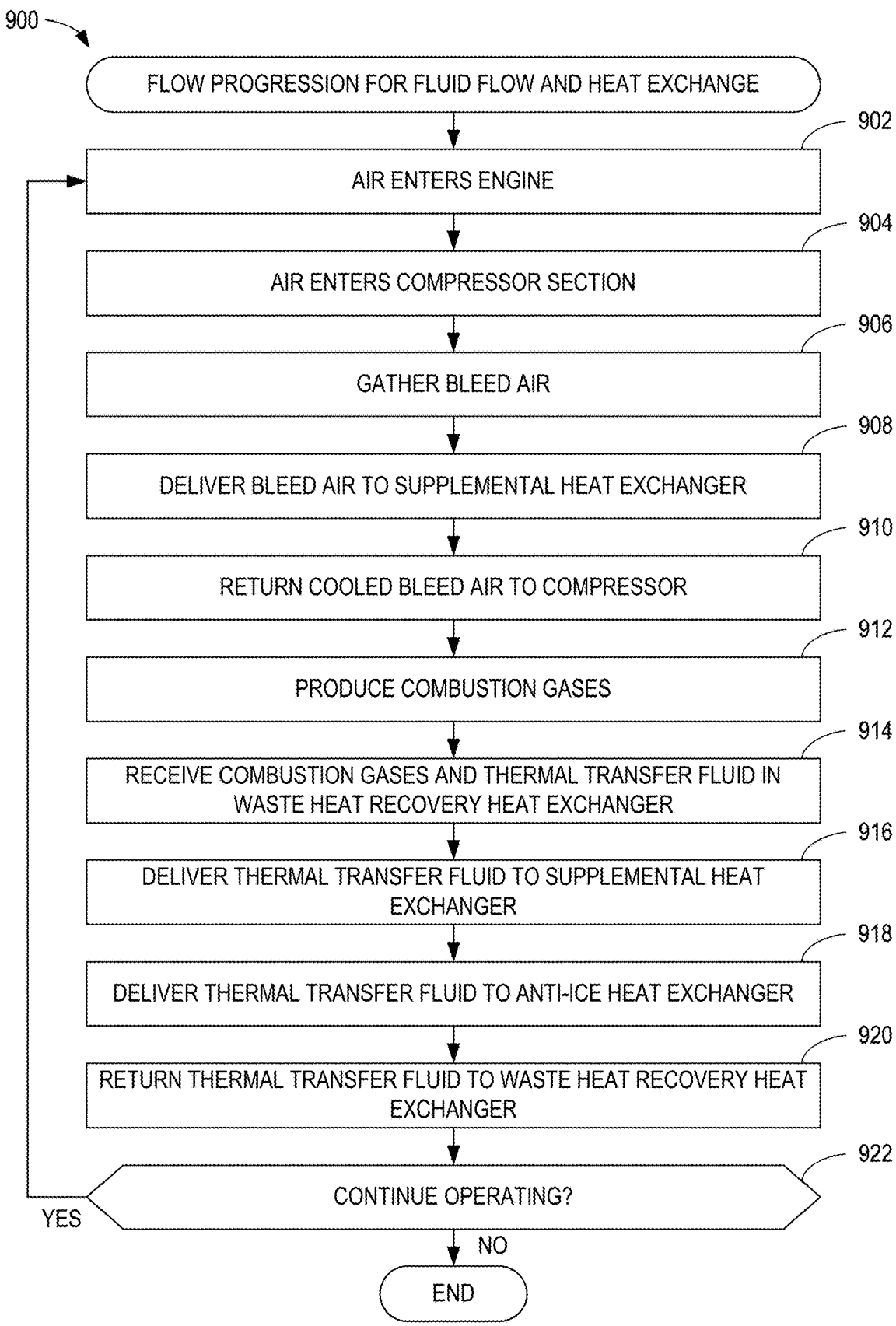
FIG. 9 is a flow chart representing an example path for fluid flow and heat exchange in the anti-ice system of FIGS. 1-8.

FIG. 9 is a flowchart representative of an example flow progression 900 for fluid flow and associated heat exchange in an anti-ice system in accordance with the teachings disclosed herein. The example flow progression 900 includes air entering the engine 100 (block 902). For example, the air 136 enters an inlet portion 138 of the engine 100. The air enters the compressor section of engine 100 (block 904). For example, the second portion 144 of the air 136 flows into the inlet 112 of the core turbine engine 104 and, thus, into the LP compressor 114.

In some examples, bleed air is gathered (block 906). For example, the bleed air may flow from the HP compressor 116 to the bleed air conduit 222 (FIG. 2) or the bleed air conduit 404 (FIGS. 4-5). In some examples, the bleed air is delivered to a supplemental heat exchange system (e.g., the supplemental heat exchange system 26, the fuel heat exchange system 204, the fuel heat exchange system 501) (block 908). In some examples, the bleed air is delivered to an anti-ice heat exchanger (e.g., the anti-ice heat exchanger 22, the anti-ice heat exchanger 207, the anti-ice heat exchanger 502). In some examples, the cooled bleed air is returned to the HP compressor 116 (block 910).

The compressed air 154 is delivered to the combustor 118 where it mixes with fuel and burns to provide combustion gases 156 (block 912). A waste heat recovery heat exchanger (e.g., the waste heat recovery heat exchanger 172) receives the combustion gases and a thermal transfer fluid downstream of the LP turbine 122 (block 914). As such, the thermal transfer fluid absorbs heat from the combustion gases 156 in the waste heat recovery heat exchanger.

In some examples, the heated thermal transfer fluid is delivered to the supplemental heat exchange system (e.g., the supplemental heat exchange system 26, the fuel heat exchange system 204, the fuel heat exchange system 302, the first fuel heat exchanger 704, the second fuel heat exchanger 706) (block 916). For example, the second supply branch 212 can carry the heated thermal transfer fluid to the fuel heat exchange system 204 of FIGS. 2, 4, and 5 or the fuel heat exchange system 302 of FIG. 3. Accordingly, the heated thermal transfer fluid can heat another fluid supporting the operations of the aircraft 10, such as fuel. In some examples, the heated thermal transfer fluid is delivered to an anti-ice heat exchanger (e.g., the anti-ice heat exchanger 22, the anti-ice heat exchanger 207, the anti-ice heat exchanger 502) (block 918). The thermal transfer fluid is returned to the waste heat recovery heat exchanger 172 (block 920). The flow progression 900 for the fluid flow and heat exchange can return to block 902 when operations associated with the aircraft 10 are to continue (block 922).

Figure 10:
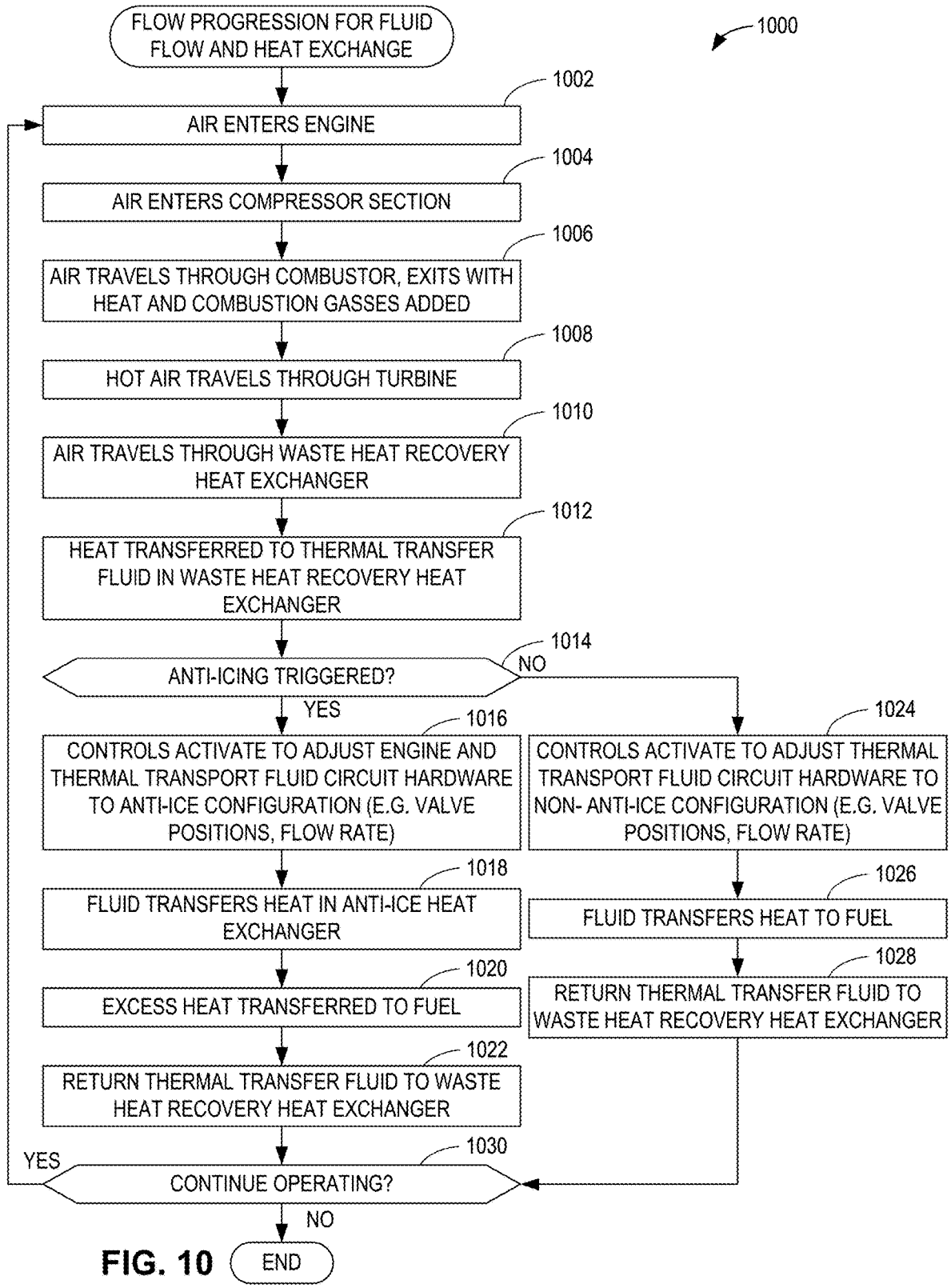
FIG. 10 is a flow chart representing an example path for fluid flow and heat exchange in the anti-ice system of FIGS. 1-8.

FIG. 10 is another flowchart representative of an example flow progression 1000 for fluid flow and associated heat exchange in an anti-ice system in accordance with the teachings disclosed herein. The example flow progression 1000 includes air entering the engine 100 (block 1002). For example, the air 136 enters an inlet portion 138 of the engine 100. The air enters the compressor section of engine 100 (block 1004). For example, the second portion 144 of the air 136 flows into the inlet 112 of the core turbine engine 104 and, thus, into the LP compressor 114 and the HP compressor 116. The air then travels through a combustor (e.g., the combustor 118) and exits with heat and combustion gasses (e.g., combustion gases 156) added (block 1006). The hot air then travels through a turbine section (e.g., HP turbine 120 and LP turbine 122) (block 1008). The hot air then travels through the waste heat recovery heat exchanger 172 (block 1010). The heat from the air in the engine is transferred to the thermal transfer fluid in the waste heat recovery heat exchanger 172 (block 1012).

In the illustrated example of FIG. 10, the flow progression 1000 for the fluid flow and heat exchange can proceed to block 1016 when anti-icing operations are triggered (block 1014). Otherwise, when anti-icing operations are not triggered, the flow progression proceeds to block 1024 (block 1014). For example, programmable circuitry associated with the pump 218 and/or the valves 220, 708, 710 can identify whether anti-icing operations are triggered based on detected ambient temperature encountered by the aircraft 10.

In the illustrated example of FIG. 10, when anti-icing is triggered, controls activate to adjust engine and thermal transfer fluid circuit hardware to an anti-ice configuration (block 1016). For example, the pump 218, the valves 220, the first split valve 708, and/or the second split valve 710 can direct the thermal transfer fluid to the anti-ice heat exchanger 207, 502. Further, the third split valve 712, the fourth split valve 714, and/or the fifth split valve 806 can control a temperature of the thermal transfer fluid and, thus, heat transferred to the portion of the aircraft 10 associated with the anti-ice heat exchanger 207. The thermal transfer fluid transfers heat in the anti-ice heat exchanger 207 (block 1018). The excess heat remaining in the thermal transfer fluid is transferred to fuel (e.g., via the fuel heat exchange system 204, the fuel heat exchange system 501, the first fuel heat exchanger 704) (block 1020). The thermal transfer fluid is then returned to the waste heat recovery heat exchanger 172 (block 1022).

In the illustrated example of FIG. 10, when anti-icing is not triggered, controls activate to adjust engine and thermal transfer fluid circuit hardware to a non-anti-ice configuration (block 1024). For example, the pump 218, the valves 220, the first split valve 708, and/or the second split valve 710 can prevent the thermal transfer fluid from flowing through the anti-ice heat exchanger 207, 502. The thermal transfer fluid then transfers heat to fuel (e.g., via the fuel heat exchange system 204, the fuel heat exchange system 501, the first fuel heat exchanger 704) (block 1026). The thermal transfer fluid is then returned to the waste heat recovery heat exchanger 172 (block 1028). The flow progression 1000 for the fluid flow and heat exchange can return to block 1002 when operations associated with the aircraft 10 are to continue (block 1030).

Figure 11:
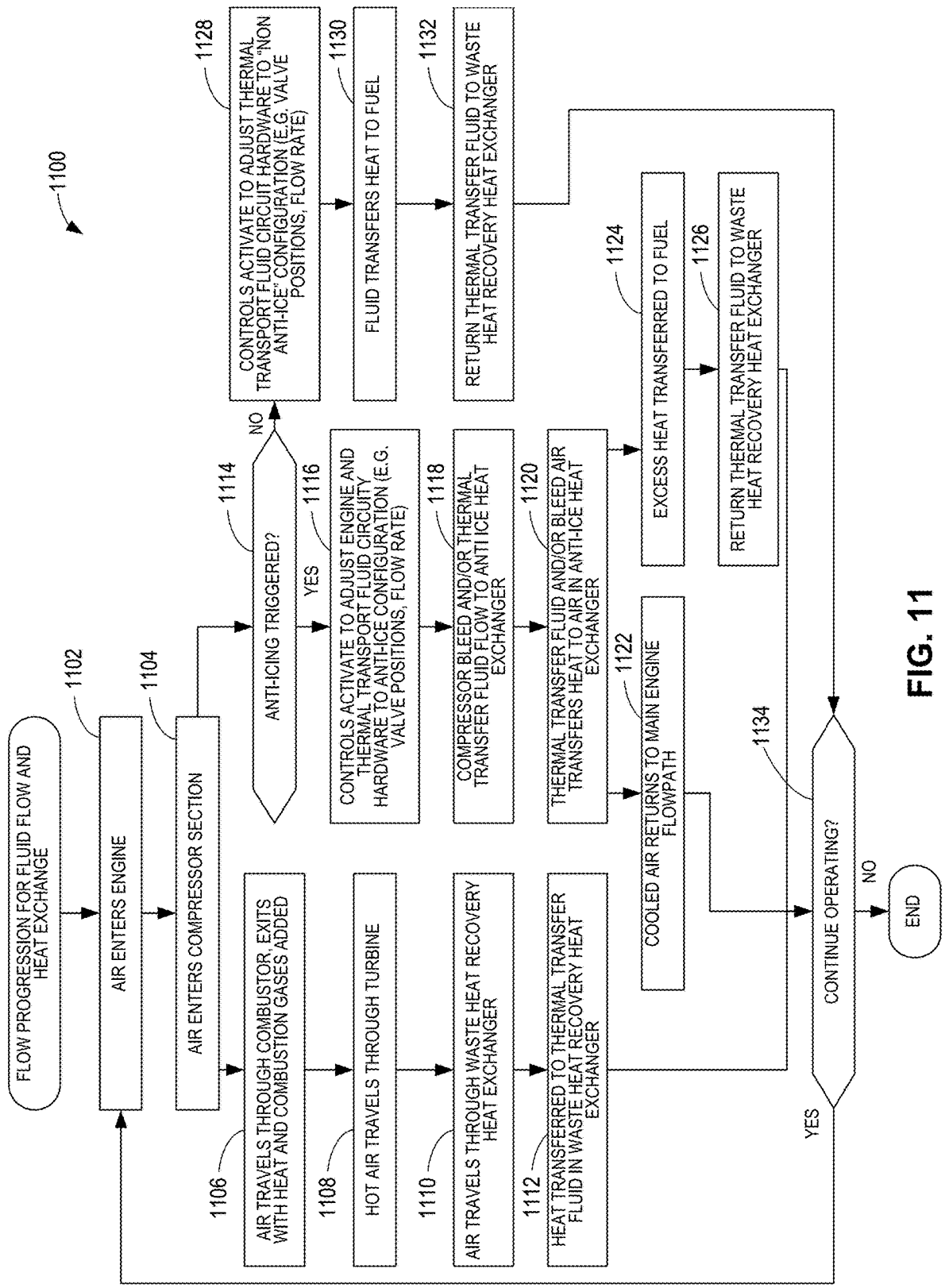
FIG. 11 is a flow chart representing an example path for fluid flow and heat exchange in the anti-ice system of FIGS. 1-8.

FIG. 11 is another flowchart representative of an example flow progression 1100 for fluid flow and associated heat exchange in an anti-ice system in accordance with the teachings disclosed herein. The example flow progression 1100 includes air entering the engine 100 (block 1102). For example, the air 136 enters an inlet portion 138 of the engine 100. The air enters the compressor section of engine 100 (block 1104). For example, the second portion 144 of the air 136 flows into the inlet 112 of the core turbine engine 104 and, thus, into the LP compressor 114 and the HP compressor 116. The air then travels through a combustor (e.g., the combustor 118) and exits with heat and combustion gasses (e.g., combustion gases 156) added (block 1106). The hot air then travels through a turbine section (e.g., HP turbine 120 and LP turbine 122) (block 1108). The hot air then travels through the waste heat recovery heat exchanger 172 (block 1110). The heat from the air in the engine is transferred to the thermal transfer fluid in the waste heat recovery heat exchanger 172 (block 1112).

In the illustrated example of FIG. 11, the flow progression 1100 for the fluid flow and heat exchange can proceed to block 1116 when anti-icing operations are triggered (block 1114). Otherwise, when anti-icing operations are not triggered, the flow progression proceeds to block 1128 (block 1114). For example, programmable circuitry associated with the pump 218 and/or the valves 220, 708, 710 can identify whether anti-icing operations are triggered based on detected ambient temperature encountered by the aircraft 10.

In the illustrated example of FIG. 11, when anti-icing is triggered, controls activate to adjust engine and thermal transfer fluid circuit hardware to an anti-ice configuration (block 1116). For example, the pump 218, the valves 220, the first split valve 708, and/or the second split valve 710 can direct the thermal transfer fluid to the anti-ice heat exchanger 207, 502. Further, the third split valve 712, the fourth split valve 714, and/or the fifth split valve 806 can control a temperature of the thermal transfer fluid and, thus, heat transferred to the portion of the aircraft 10 associated with the anti-ice heat exchanger 207. Compressor bleed air and/or the thermal transfer fluid flow to the anti-ice heat exchanger 207 (block 1120). Compressor bleed air and/or the thermal transfer fluid transfers heat to air in the anti-ice heat exchanger 207 (block 1120). The cooled bleed air returns to the main engine flow path (e.g., to the HP compressor 116) (block 1122). The excess heat remaining in the thermal transfer fluid is transferred to fuel (e.g., via the fuel heat exchange system 204, the fuel heat exchange system 501, the first fuel heat exchanger 704) (block 1124). The thermal transfer fluid is then returned to the waste heat recovery heat exchanger 172 (block 1126).

In the illustrated example of FIG. 11, when anti-icing is not triggered, controls activate to adjust engine and thermal transfer fluid circuit hardware to a non-anti-ice configuration (block 1128). For example, the pump 218, the valves 220, the first split valve 708, and/or the second split valve 710 can prevent the thermal transfer fluid from flowing through the anti-ice heat exchanger 207, 502. The thermal transfer fluid then transfers heat to fuel (e.g., via the fuel heat exchange system 204, the fuel heat exchange system 501, the first fuel heat exchanger 704) (block 1130). The thermal transfer fluid is then returned to the waste heat recovery heat exchanger 172 (block 1132). The flow progression 1100 for the fluid flow and heat exchange can return to block 1102 when operations associated with the aircraft 10 are to continue (block 1134).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

From the foregoing, it will be appreciated that example systems have been disclosed that enable a thermal transfer fluid to heat a portion of an aircraft to prevent or reduce the accumulation and/or formation of ice. In some examples, causing the thermal transfer fluid to supply anti-ice heat to the portion of the aircraft enables the amount of bleed air taken from a compressor section of the engine to be optimized for engine performance. That is, the amount of bleed air taken from the compressor section can be reduced relative to when the bleed air is relied upon to supply the anti-ice heat. As a result, the reduced flow extraction from the compressor section improves a performance of the engine by enabling some cooled air to be reintroduced into the compressor section without requiring an amount of bleed air to be extracted that would otherwise affect the engine performance. Additionally, example systems have been disclosed including anti-ice systems that can be adapted to a particular aircraft and/or engine.

Example methods and apparatus for anti-ice heat supply from waste heat recovery systems are disclosed herein. Further examples and combinations thereof include the following clauses:

An apparatus for an aircraft, the system comprising a fuel heat exchange system, an anti-ice heat exchanger, a waste heat recovery heat exchanger, and a conduit coupled to the fuel heat exchange system, the anti-ice heat exchanger, and the waste heat recovery heat exchanger, the conduit including a first portion and a second portion distinct from the first portion, wherein the first portion of the conduit carries a first portion of a thermal transfer fluid from the waste heat recovery heat exchanger to the anti-ice heat exchanger in which the thermal transfer fluid supplies anti-ice heat to a portion of the aircraft, wherein the second portion of the conduit carries a second portion of the thermal transfer fluid from the waste heat recovery heat exchanger to the fuel heat exchange system in which the second portion of the thermal transfer fluid supplies heat to a fuel to be injected into a combustor of an aircraft engine.

The apparatus of any preceding clause, wherein the first portion and the second portion of the conduit are a first supply portion and a second supply portion, wherein the conduit includes a return portion that carries at least one of the first portion or the second portion of the thermal transfer fluid from the fuel heat exchange system to the waste heat recovery heat exchanger after at least one of (i) the first portion of the thermal transfer fluid supplies the anti-ice heat in the anti-ice heat exchanger or (ii) the second portion of the thermal transfer fluid heats fuel in the fuel heat exchange system.

The apparatus of any preceding clause, wherein the return portion of the conduit is a first return portion, wherein the conduit includes a second return portion that carries the first portion of the thermal transfer fluid from the anti-ice heat exchanger to the fuel heat exchange system after the first supply portion of the conduit carries the first portion of the thermal transfer fluid to the anti-ice heat exchanger and before returning the first portion of the thermal transfer fluid to the waste heat recovery heat exchanger.

The apparatus of any preceding clause, wherein the conduit is a first conduit, further including a second conduit that is fluidly separate from the first conduit, the second conduit to carry bleed air between a compressor section of the aircraft engine and the fuel heat exchange system in which the bleed air heats fuel.

The apparatus of any preceding clause, wherein the bleed air is a first portion of the bleed air, and wherein the second conduit carries a second portion of the bleed air to the anti-ice heat exchanger.

The apparatus of any preceding clause, wherein the second conduit carries the second portion of the bleed air from the anti-ice heat exchanger to the fuel heat exchange system.

The apparatus of any preceding clause, further including an aircraft engine, and wherein the waste heat recovery heat exchanger is positioned in a core flow path of the aircraft engine.

The apparatus of any preceding clause, wherein the anti-ice heat exchanger is positioned in a wing of the aircraft.

An aircraft system comprising a waste heat recovery heat exchanger positioned in an aircraft engine, wherein the waste heat recovery heat exchanger causes combustion gases produced by the aircraft engine to transfer heat to a thermal transfer fluid, and a conduit coupled to the waste heat recovery heat exchanger, an anti-ice heat exchanger, and a supplemental heat exchange system, the conduit including a first portion and a second portion distinct from the first portion, wherein the first portion of the conduit carries the thermal transfer fluid from the waste heat recovery heat exchanger to the anti-ice heat exchanger in which the thermal transfer fluid transfers heat to a portion of an aircraft, and wherein the second portion of the conduit carries the thermal transfer fluid to the supplemental heat exchange system distinct from the waste heat recovery heat exchanger and the anti-ice heat exchanger.

The aircraft system of any preceding clause, wherein the conduit returns the first portion of the thermal transfer fluid to the waste heat recovery heat exchanger after the first portion of the thermal transfer fluid flows to the anti-ice heat exchanger, and wherein the conduit returns the second portion of the thermal transfer fluid to the waste heat recovery heat exchanger after the second portion of the thermal transfer fluid flows to the supplemental heat exchange system.

The aircraft system of any preceding clause, wherein the conduit carries the first portion of the thermal transfer fluid to the supplemental heat exchange system after carrying the first portion of the thermal transfer fluid to the anti-ice heat exchanger and before returning the first portion of the thermal transfer fluid to the waste heat recovery heat exchanger.

The aircraft system of any preceding clause, wherein the conduit is a first conduit, further including a second conduit to carry bleed air between a compressor section of the aircraft engine and the supplemental heat exchange system.

The aircraft system of any preceding clause, wherein the second conduit includes a first portion and a second portion, wherein the first portion of the second conduit carries the bleed air from the compressor section to the supplemental heat exchange system, wherein the second portion of the second conduit carries the bleed air from the compressor section to the anti-ice heat exchanger.

The aircraft system of any preceding clause, wherein the thermal transfer fluid and the bleed air heat fuel being delivered to the aircraft engine in the supplemental heat exchange system.

The aircraft system of any preceding clause, wherein the conduit includes a junction between (i) an outlet of the waste heat recovery heat exchanger and (ii) the anti-ice heat exchanger and the supplemental heat exchange system, wherein the first portion of the conduit and the second portion of the conduit connect at the junction.

An aircraft comprising an anti-ice heat exchanger, a fuel heat exchange system, a waste heat recovery heat exchanger, and a conduit coupled to the anti-ice heat exchanger, the fuel heat exchange system, and the waste heat recovery heat exchanger, the conduit to carry a thermal transfer fluid to the anti-ice heat exchanger, the fuel heat exchange system, and the waste heat recovery heat exchanger, wherein the thermal transfer fluid receives heat from exhaust gases in the waste heat recovery heat exchanger, wherein the thermal transfer fluid delivers a first portion of the heat to fuel in the fuel heat exchange system, and wherein the thermal transfer fluid delivers a second portion of the heat to a portion of the aircraft in the anti-ice heat exchanger.

The aircraft of any preceding clause, wherein the conduit includes a first return portion and a second return portion, wherein the first return portion carries the thermal transfer fluid from the anti-ice heat exchanger to the fuel heat exchange system or the second return portion, and wherein the second return portion carries the thermal transfer fluid from the fuel heat exchange system to the waste heat recovery heat exchanger.

The aircraft of any preceding clause, further including an aircraft engine, wherein the conduit is a first conduit, further including a second conduit that is fluidly separate from the first conduit, the second conduit to carry bleed air between a compressor section of the aircraft engine and the fuel heat exchange system in which the bleed air heats the fuel.

The aircraft of any preceding clause, wherein the bleed air heats the fuel in a first portion of the fuel heat exchange system, and wherein the thermal transfer fluid heats the fuel in a second portion of the fuel heat exchange system, wherein the second portion of the fuel heat exchange system is downstream of the first portion of the fuel heat exchange system.

The aircraft of any preceding clause, wherein the second conduit carries the bleed air to the anti-ice heat exchanger.

A system for an aircraft, the system comprising an anti-ice heat exchanger, a waste heat recovery heat exchanger, and a conduit including a supply portion and a return portion coupled to the waste heat recovery heat exchanger and the anti-ice heat exchanger, wherein the supply portion of the conduit carries the thermal transfer fluid from the waste heat recovery heat exchanger to the anti-ice heat exchanger in which the thermal transfer fluid supplies anti-ice heat to a portion of the aircraft, wherein the return portion of the conduit carries the thermal transfer fluid from the anti-ice heat exchanger to the waste heat recovery heat exchanger in which the thermal transfer fluid receives heat from exhaust gases produced by an aircraft engine.

The system of any preceding clause, wherein the conduit defines a closed-loop flow path.

The apparatus of any preceding clause, wherein the conduit includes a junction between (i) an outlet of the waste heat recovery heat exchanger and (ii) inlets of the anti-ice heat exchanger and the fuel heat exchange system, wherein the first portion of the conduit and the second portion of the conduit connect at the junction.

The apparatus of any preceding clause, wherein the conduit carries the thermal transfer fluid to a cooled cooling air heat exchanger in which the thermal transfer fluid absorbs heat from air to be returned to a compressor.

The apparatus of any preceding clause, wherein the conduit includes a first split valve and a second split valve, wherein the first split valve controls a first ratio of (i) the thermal transfer fluid that flows to the cooled cooling air heat exchanger to (ii) the thermal transfer fluid that flows to the second split valve, and wherein the second split valve controls a second ratio of (i) the thermal transfer fluid that flows to the waste heat recovery heat exchanger to (ii) the thermal transfer fluid that bypasses the waste heat recovery heat exchanger.

The apparatus of any preceding clause, further including a first fluid mixer and a second fluid mixer, wherein the first fluid mixer mixes the thermal transfer fluid that flows to the cooled cooling air heat exchanger with the thermal transfer fluid that flows to the waste heat recovery heat exchanger, and wherein the second fluid mixer mixes the thermal transfer fluid that bypasses that the waste heat recovery heat exchanger with the thermal transfer fluid that flow to the waste heat recovery heat exchanger and the thermal transfer fluid that flows through the cooled cooling air heat exchanger.

The apparatus of any preceding clause, wherein the conduit includes a third portion in which the thermal transfer fluid bypasses the anti-ice heat exchanger and the fuel heat exchange system.

The apparatus of any preceding clause, further including a fluid mixer to mix the thermal transfer fluid bypasses the anti-ice heat exchanger and the fuel heat exchange system with the thermal transfer fluid that flows through the anti-ice heat exchanger and the fuel heat exchange system.

The apparatus of any preceding clause, wherein the first portion of the conduit includes a first branch and a second branch, wherein the first branch carries the thermal transfer fluid from the anti-ice heat exchanger to the fuel heat exchange system, and wherein the second branch causes the thermal transfer fluid from the anti-ice heat exchanger to bypass the fuel heat exchange system, and further including a split valve to control a ratio of the thermal transfer fluid that flows through the first branch compared to the second branch.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus for an aircraft, the apparatus comprising:
a fuel heat exchange system including a first fuel heat exchanger and a second fuel heat exchanger, wherein the second fuel heat exchanger receives a fuel to be injected into a combustor of an aircraft engine downstream of the first fuel heat exchanger;
an anti-ice heat exchanger;
a waste heat recovery heat exchanger; and
a conduit coupled to the fuel heat exchange system, the anti-ice heat exchanger, and the waste heat recovery heat exchanger, the conduit including a first portion, a second portion distinct from the first portion, and a third portion distinct from the first portion and the second portion, wherein the first portion of the conduit carries a first portion of a thermal transfer fluid from the waste heat recovery heat exchanger to the anti-ice heat exchanger in which the thermal transfer fluid supplies anti-ice heat to a portion of the aircraft, wherein the second portion of the conduit carries the first portion of the thermal transfer fluid from the anti-ice heat exchanger to the first fuel heat exchanger in which the first portion of the thermal transfer fluid supplies first heat to the fuel, wherein the third portion of the conduit carries a second portion of the thermal transfer fluid from the waste heat recovery heat exchanger to the second fuel heat exchanger in which the second portion of the thermal transfer fluid supplies second heat to the fuel, and wherein the third portion of the conduit maintains the second portion of the thermal transfer fluid separate from the first portion of the thermal transfer fluid that supplied anti-ice heat to the portion of the aircraft.

2. The apparatus of claim 1, wherein the first portion and the second portion of the conduit are a first supply portion and a second supply portion, wherein the conduit includes a return portion that carries at least one of the first portion or the second portion of the thermal transfer fluid from the fuel heat exchange system to the waste heat recovery heat exchanger after at least one of (i) the first portion of the thermal transfer fluid supplies the anti-ice heat in the anti-ice heat exchanger or (ii) the second portion of the thermal transfer fluid heats fuel in the fuel heat exchange system.

3. The apparatus of claim 2, wherein the return portion of the conduit is a first return portion, wherein the conduit includes a second return portion that carries the first portion of the thermal transfer fluid from the first fuel heat exchanger to the waste heat recovery heat exchanger.

4. The apparatus of claim 1, wherein the conduit is a first conduit, further including a second conduit that is fluidly separate from the first conduit, the second conduit to carry bleed air between a compressor section of the aircraft engine and the fuel heat exchange system in which the bleed air heats fuel.

5. The apparatus of claim 4, wherein the bleed air is a first portion of the bleed air, and wherein the second conduit carries a second portion of the bleed air to the anti-ice heat exchanger.

6. The apparatus of claim 5, wherein the second conduit carries the second portion of the bleed air from the anti-ice heat exchanger to the fuel heat exchange system.

7. The apparatus of claim 1, further including an aircraft engine, and wherein the waste heat recovery heat exchanger is positioned in a core flow path of the aircraft engine.

8. The apparatus of claim 1, wherein the anti-ice heat exchanger is positioned in a wing of the aircraft.

9. An aircraft system comprising:
a waste heat recovery heat exchanger positioned in an aircraft engine, wherein the waste heat recovery heat exchanger causes combustion gases produced by the aircraft engine to transfer heat to a thermal transfer fluid; and
a conduit coupled to the waste heat recovery heat exchanger, an anti-ice heat exchanger, and a supplemental heat exchange system, the conduit including a first portion, a second portion distinct from the first portion, and a third portion distinct from the first portion and the second portion, wherein the first portion of the conduit carries the thermal transfer fluid from the waste heat recovery heat exchanger to the anti-ice heat exchanger in which the thermal transfer fluid transfers heat to a portion of an aircraft, wherein the second portion of the conduit carries the thermal transfer fluid from the anti-ice heat exchanger to a first heat exchanger of the supplemental heat exchange system, and wherein the third portion of the conduit carries the thermal transfer fluid from the waste heat recovery heat exchanger to a second heat exchanger of the supplemental heat exchange system distinct from the waste heat recovery heat exchanger and the anti-ice heat exchanger, the second heat exchanger to receive a second fluid heated by the thermal transfer fluid in the first heat exchanger, and wherein the third portion of the conduit is configured to maintain a first portion of the thermal transfer fluid to be delivered to the second heat exchanger separate from a second portion of the thermal transfer fluid that transferred heat to the portion of the aircraft.

10. The aircraft system of claim 9, wherein the conduit includes a fourth portion that returns the thermal transfer fluid to the waste heat recovery heat exchanger after the thermal transfer fluid flows to the anti-ice heat exchanger and before the thermal transfer fluid flows to the supplemental heat exchange system, and wherein the conduit includes a fifth portion that returns the thermal transfer fluid to the waste heat recovery heat exchanger after the thermal transfer fluid flows to the first heat exchanger of the supplemental heat exchange system.

11. The aircraft system of claim 10, wherein the conduit includes a sixth portion that carries the thermal transfer fluid from the second heat exchanger of the supplemental heat exchange system to the waste heat recovery heat exchanger.

12. The aircraft system of claim 9, wherein the conduit is a first conduit, further including a second conduit to carry bleed air between a compressor section of the aircraft engine and the supplemental heat exchange system.

13. The aircraft system of claim 12, wherein the second conduit includes a first portion and a second portion, wherein the first portion of the second conduit carries the bleed air from the compressor section to the supplemental heat exchange system, wherein the second portion of the second conduit carries the bleed air from the compressor section to the anti-ice heat exchanger.

14. The aircraft system of claim 12, wherein the thermal transfer fluid and the bleed air heat fuel being delivered to the aircraft engine in the supplemental heat exchange system.

15. The aircraft system of claim 9, wherein the conduit includes a junction between (i) an outlet of the waste heat recovery heat exchanger and (ii) the anti-ice heat exchanger and the supplemental heat exchange system, wherein the first portion of the conduit and the third portion of the conduit connect at the junction.

16. An aircraft comprising:
an anti-ice heat exchanger;
a fuel heat exchange system including a first fuel heat exchanger and a second fuel heat exchanger, wherein the second fuel heat exchanger receives a fuel to be injected into a combustor of an aircraft engine downstream of the first fuel heat exchanger;
a waste heat recovery heat exchanger positioned in a core flow path of an aircraft engine; and
a conduit coupled to the anti-ice heat exchanger, the fuel heat exchange system, and the waste heat recovery heat exchanger, the conduit to carry a thermal transfer fluid to the anti-ice heat exchanger, the fuel heat exchange system, and the waste heat recovery heat exchanger, wherein the thermal transfer fluid receives heat from exhaust gases in the waste heat recovery heat exchanger, wherein a first portion of the thermal transfer fluid delivers a first portion of the heat to fuel in the second fuel heat exchanger in the fuel heat exchange system, wherein a second portion of the thermal transfer fluid delivers a second portion of the heat to a portion of the aircraft in the anti-ice heat exchanger, wherein at least some of the second portion of the thermal transfer fluid delivers a third portion of the heat to the fuel in the first fuel heat exchanger, wherein the fuel receives the first portion of the heat in the second fuel heat exchanger after receiving the third portion of the heat in the first fuel heat exchanger, and wherein the conduit is configured to prevent the first portion of the thermal transfer fluid from mixing with the second portion of the thermal transfer fluid after the second portion delivers the second portion of the heat at least until after the first portion of the thermal transfer fluid has delivered the first portion of the heat.

17. The aircraft of claim 16, wherein the conduit includes a first return portion and a second return portion, wherein the first return portion carries the thermal transfer fluid from the anti-ice heat exchanger to the second return portion, and wherein the second return portion carries the thermal transfer fluid from the fuel heat exchange system to the waste heat recovery heat exchanger.

18. The aircraft of claim 16, further including an aircraft engine, wherein the conduit is a first conduit, further including a second conduit that is fluidly separate from the first conduit, the second conduit to carry bleed air between a compressor section of the aircraft engine and the fuel heat exchange system in which the bleed air heats the fuel.

19. The aircraft of claim 18, wherein the bleed air heats the fuel in a first portion of the fuel heat exchange system, and wherein the thermal transfer fluid heats the fuel in a second portion of the fuel heat exchange system, wherein the second portion of the fuel heat exchange system is downstream of the first portion of the fuel heat exchange system.

20. The aircraft of claim 18, wherein the second conduit carries the bleed air to the anti-ice heat exchanger.

* * * * *